(12) United States Patent
Kwon et al.

(10) Patent No.: US 11,361,500 B2
(45) Date of Patent: Jun. 14, 2022

(54) RECONSTRUCTING 3D VIDEO USING PARTICLE FILTERING TO AGGREGATE CROWD RESPONSES

(71) Applicant: The Regents of The University of Michigan, Ann Arbor, MI (US)

(72) Inventors: Jean Young S. Kwon, Daejeon (KR); Stephan Lemmer, Belleville, MI (US); Jason Corso, Chelsea, MI (US); Walter S. Lasecki, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/704,529

(22) Filed: Dec. 5, 2019

(65) Prior Publication Data

US 2020/0202615 A1     Jun. 25, 2020

Related U.S. Application Data

(60) Provisional application No. 62/783,815, filed on Dec. 21, 2018.

(51) Int. Cl.
*G06T 17/00* (2006.01)
*G06T 11/20* (2006.01)

(52) U.S. Cl.
CPC .............. *G06T 17/00* (2013.01); *G06T 11/20* (2013.01); *G06T 2200/08* (2013.01); *G06T 2207/10016* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,953,535 B1* | 4/2018 | Canavor | G05D 1/0289 |
| 2017/0200061 A1* | 7/2017 | Julian | G06K 9/00791 |
| 2019/0026956 A1* | 1/2019 | Gausebeck | G06T 7/579 |
| 2020/0026905 A1* | 1/2020 | Karg | G06K 9/4628 |

OTHER PUBLICATIONS

Li, Jiachen et al, "Generic Vehicle Tracking Framework Capable of Handling Occlusions Based on Modified Mixture Particle Filter", 2018 IEEE Intelligent Vehicles Symposium (IV) Intelligent Vehicles Symposium (IV), 2018 IEEE. :936-942 Jun. 2018.*

(Continued)

*Primary Examiner* — Tize Ma
(74) *Attorney, Agent, or Firm* — Quarles & Brady LLP

(57) ABSTRACT

A method is disclosed for reconstructing three-dimensional video from two-dimensional video data using particle filtering and thereby generating training data for autonomous vehicles. In one version, the method comprises: receiving a set of annotations associated with a video frame comprising a view of at least a portion of a vehicle, each annotation comprising at least one two-dimensional line; removing at least one outlier from the set of annotations; determining an estimated vehicle model based on the set of annotations; and providing the estimated vehicle model to a driving simulator.

20 Claims, 17 Drawing Sheets
(15 of 17 Drawing Sheet(s) Filed in Color)

(56) References Cited

OTHER PUBLICATIONS

Wang, Ling et al, "An efficient refinement algorithm for multi-label image annotation with correlation model", Telecommun Syst (2015) 60:285-301, Published online: Apr. 2, 2015 © Springer Science+Business Media New York 2015.*
Wiegand et al., Overview of the H. 264/AVC Video Coding Standard, IEEE Transactions on Circuits and Systems for Video Technology, 2003, 13(7):560-576.
Yim et al., Coding Varied Behavior Types Using the Crowd, In Proceedings of the 19th ACM Conference on Computer Supported Cooperative Work and Social Computing Companion, 2016, pp. 114-117.
Yuen et al., LabelMe Video: Building a Video Database with Human Annotations, In 2009 IEEE 12th International Conference on Computer Vision, 2009, pp. 1451-1458.
Zhong et al., RegionSpeak: Quick Comprehensive Spatial Descriptions of Complex Images for Blind Users, In Proceedings of the 33rd Annual ACM Conference on Human Factors in Computing Systems, 2015, pp. 2353-2362.
Zhu et al., Algorithm 778: L-BFGS-B: Fortran Subroutines for Large-Scale Bound-Constrained Optimization, ACM Transactions on Mathematical Software, 1997, 23(4):550-560.
Bell et al., OpenSurfaces: A Richly Annotated Catalog of Surface Appearance, ACM Transactions on Graphics, 2013, vol. 32, No. 4, Article 111, 11 pages.
Bernstein et al., Crowds in Two Seconds: Enabling Realtime Crowd-Powered Interfaces, In Proceedings of the 24th Annual ACM Symposium on User Interface Software and Technology, 2011, pp. 33-42.
Bigham et al., VizWiz: Nearly Real-Time Answers to Visual Questions, In Proceedings of the 23nd Annual ACM Symposium on User Interface Software and Technology, 2010, pp. 333-342.
Bojarski et al., End to End Learning for Self-Driving Cars, 2016, arXiv preprint arXiv:1604.07316, 9 pages.
Bragg et al., Crowdsourcing Multi-Label Classification for Taxonomy Creation, Copyright 2013 Association for the Advancement of Artificial Intelligence, 9 pages.
Bray et al., Smart Particle Filtering for 3D Hand Tracking, In Sixth IEEE International Conference on Automatic Face and Gesture Recognition, 2004, 6 pages.
Chang et al., Revolt: Collaborative Crowdsourcing for Labeling Machine Learning Datasets, In Proceedings of the 2017 CHI Conference on Human Factors in Computing Systems, 13 pages.
Dawid et al., Maximum Likelihood Estimation of Observer Error-Rates Using the EM Algorithm, Journal of the Royal Statistical Society: Series C (Applied Statistics), 1979, 28(1):20-28.
Di Salvo et al., A Crowdsourcing Approach to Support Video Annotation, In Proceedings of the International Workshop on Video and Image Ground Truth in Computer Vision Applications, 2013, pp. 1-6.
Dosovitskiy et al., CARLA: An Open Urban Driving Simulator, arXiv preprint arXiv:1711.03938, 2017, 16 pages.
Gadiraju et al., Training Workers for Improving Performance in Crowdsourcing Microtasks, In Design for Teaching and Learning in a Networked World, 2015, pp. 100-114.
Geiger et al., Are We Ready for Autonomous Driving? The KITTI Vision Benchmark Suite, In 2012 IEEE Conference on Computer Vision and Pattern Recognition, pp. 3354-3361.
Gordon et al., LegionTools: A Toolkit + UI for Recruiting and Routing Crowds to Synchronous Real-Time Tasks, In Adjunct Proceedings of the 28th Annual ACM Symposium on User Interface Software & Technology, 2015, pp. 81-82.
Gouravahjala et al., EURECA: Enhanced Understanding of Real Environments Via Crowd Assistance, In AAAI Conference on Human Computation, 2018, 10 pages.
Hara et al., Tohme: Detecting Curb Ramps in Google Street View Using Crowdsourcing, Computer Vision, and Machine Learning, In Proceedings of the 27th Annual ACM Symposium on User Interface Software and Technology, 2014, pp. 189-204.
Ipeirotis et al., Quality Management on Amazon Mechanical Turk, In Proceedings of the ACM SIGKDD Workshop on Human Computation, 2010, pp. 64-67.
Kalra et al., Driving to Safety: How Many Miles of Driving Would It Take To Demonstrate Autonomous Vehicle Reliability?, Transportation Research Part A, 2016, 94:182-193.
Kamar et al., Combining Human and Machine Intelligence in Large-Scale Crowdsourcing, Proceedings of the 11th International Conference on Autonomous Agents and Multiagent Systems, 2012, 12:467-474.
Kaspar et al., Crowd-Guided Ensembles: How can we Choreograph Crowd Workers for Video Segmentation?, In Proceedings of the 2018 CHI Conference on Human Factors in Computing Systems, pp. 1-12.
Kaur et al., CrowdMask: Using Crowds to Preserve Privacy in Crowd-Powered Systems via Progressive Filtering, In HCOMP, 2017, pp. 89-97.
Kim et al., Crowdsourcing Step-by-Step Information Extraction to Enhance Existing How-To Videos, In Proceedings of the 32nd Annual ACM Conference on Human Factors in Computing Systems, 2014, pp. 4017-4026.
Kittur et al., The Future of Crowd Work, In Proceedings of the 2013 Conference on Computer Supported Cooperative Work, pp. 1301-1317.
Krishna et al., Visual Genome: Connecting Language and Vision Using Crowdsourced Dense Image Annotations, International Journal of Computer Vision, 2017, 123(1):32-73.
Kwolek, Model Based Facial Pose Tracking Using a Particle Filter, In Geometric Modeling and Imaging—New Trends (GMAI'06), IEEE, 2006, pp. 203-208.
Laput et al., Zensors: Adaptive, Rapidly Deployable, Human-Intelligent Sensor Feeds, In Proceedings of the 33rd Annual ACM Conference on Human Factors in Computing Systems, 2015, pp. 1935-1944.
Lasecki et al., Real-Time Crowd Control of Existing Interfaces, In Proceedings of the 24th Annual ACM Symposium on User Interface Software and Technology, 2011, pp. 23-32.
Lasecki et al., Real-Time Crowd Labeling for Deployable Activity Recognition, In Proceedings of the 2013 Conference on Computer Supported Cooperative Work, pp. 1203-1212.
Lasecki et al., Chorus: A Crowd-Powered Conversational Assistant, In Proceedings of the 26th Annual ACM Symposium on User Interface Software and Technology, 2013, pp. 151-162.
Lasecki et al., Glance: Rapidly Coding Behavioral Video with the Crowd, In Proceedings of the 27th Annual ACM Symposium on User Interface Software and Technology, 2014, pp. 551-562.
Lasecki et al., Architecting Real-Time Crowd-Powered Systems, Human Computation, 2014, 1(1):67-93.
Lasecki et al., Tuning the Diversity of Open-Ended Responses from the Crowd, Copyright 2014 Association for the Advancement of Artificial Intelligence, 2 pages.
Lin et al., Dynamically Switching Between Synergistic Workflows for Crowdsourcing, In Proceedings of the Twenty-Sixth AAAI Conference on Artificial Intelligence, 2012, pp. 87-93.
Lin et al., Microsoft COCO: Common Objects in Context, In European Conference on Computer Vision, 2014, pp. 740-755.
Madrigal, Inside Waymo's Secret World for Training Self-Driving Cars, The Atlantic, https://www.theatlantic.com/technology/archive/2017/08/inside-waymos-secret-testing-and-simulation-facilities/537648/, Aug. 23, 2017, 26 pages.
Mao et al., Volunteering Versus Work for Pay: Incentives and Tradeoffs in Crowdsourcing, In Proceedings of the First AAAI Conference on Human Computation and Crowdsourcing, 2013, pp. 94-102.
Montemerlo et al., FastSLAM: A Factored Solution to the Simultaneous Localization and Mapping Problem, AAAI-02 Proceedings, pp. 593-598.
Necker, LXI. Observations on Some Remarkable Optical Phenomena Seen in Switzerland; and on an Optical Phenomenon which Occurs on Viewing a Figure of a Crystal or Geometrical Solid, The

(56) References Cited

OTHER PUBLICATIONS

London and Edinburgh Philosophical Magazine and Journal of Science, 1832, Third Series, 1(5):329-337.

Oka et al., Head Pose Estimation System Based on Particle Filtering with Adaptive Diffusion Control, MVA2005 IAPR Conference on Machine Vision Applications, 2005, pp. 586-589.

Park et al., Crowdsourcing Micro-Level Multimedia Annotations: The Challenges of Evaluation and Interface, In Proceedings of the ACM Multimedia 2012 Workshop on Crowdsourcing for Multimedia, 2012, pp. 29-34.

Pishchulin et al., Building Statistical Shape Spaces for 3d Human Modeling, Pattern Recognition, 2017, 67:276-286.

Rao et al., Plexiglass: Multiplexing Passive and Active Tasks for More Efficient Crowdsourcing, In HCOMP, 2018, pp. 145-153.

Shah et al., Double or Nothing: Multiplicative Incentive Mechanisms for Crowdsourcing, Advances in Neural Information Processing Systems, 2015, pp. 1-9.

Silver, Waymo Has The Most Autonomous Miles, By A Lot, https://www.forbes.com/sites/davidsilver/2018/07/26/waymo-has-the-most-autonomous-miles-by-a-lot/, Jul. 26, 2018, 2 pages.

Song et al., Two Tools are Better than One: Tool Diversity as a Means of Improving Aggregate Crowd Performance, In 23rd International Conference on Intelligent User Interfaces, 2018, pp. 559-570.

Sorokin et al., People Helping Robots Helping People: Crowdsourcing for Grasping Novel Objects, In 2010 IEEE/RSJ International Conference on Intelligent Robots and Systems, 2010, pp. 2117-2122.

Su et al., Render for CNN: Viewpoint Estimation in Images using CNNs Trained with Rendered 3D Model Views, In Proceedings of the IEEE International Conference on Computer Vision, 2015, pp. 2686-2694.

Szeto et al., Click Here: Human-Localized Keypoints as Guidance for Viewpoint Estimation, Proceedings of the IEEE International Conference on Computer Vision, 2017, pp. 1595-1604.

Thrun, Monte Carlo POMDPs, In Advances in Neural Information Processing Systems, 2000, pp. 1064-1070.

Tsai et al., Fast Quasi-Newton Algorithms for Penalized Reconstruction in Emission Tomography and Further Improvements Via Preconditioning, IEEE Transactions on Medical Imaging, 2017, 37(4):1000-1010.

Vondrick et al., Efficiently Scaling Up Crowdsourced Video Annotation, International Journal of Computer Vision, 2013, 101(1):184-204.

\* cited by examiner

FIG. 3A

Instructions (takes 5 mins to read)

In this task, your job is to draw "dimension lines" on a specified object.
The dimension lines should represent the dimension of a cuboid that encloses the object as below:

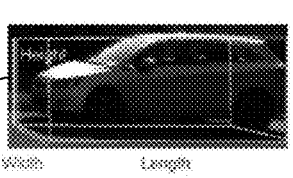

Your task is to draw these lines as accurate as possible on the specified object.

Please tell us by clicking I cannot draw **button if you you are not confident in drawing accurately.
Some of the objects can be challenging: truncated, overlapped, or have bad angles.**

Examples results, showing length (in red), width (in orange), height (in yellow):

(a) Instructions for crowd workers

RECONSTRUCTING 3D VIDEO USING PARTICLE FILTERING TO AGGREGATE CROWD RESPONSES

CROSS-REFERENCES TO RELATED APPLICATIONS

This application claims priority to U.S. Patent Application No. 62/783,815 filed Dec. 21, 2018.

STATEMENT REGARDING FEDERALLY SPONSORED RESEARCH

Not Applicable.

BACKGROUND OF THE INVENTION

1. Field of the Invention

This invention relates to reconstructing three-dimensional video from two-dimensional video data using particle filtering and generating training data for autonomous vehicles.

2. Description of the Related Art

Collecting a sufficient amount of three dimensional (3D) training data for autonomous vehicles to handle rare, but critical, traffic events (e.g., collisions) may take decades of deployment. Autonomous vehicles collect large quantities of training data by operating, or being operated, in their target environment. This data is used to teach the vehicle how to adjust to and interact with the physical world [Ref. 6]. However, research suffers from a lack of realistic training data, especially of rare and unusual events such as traffic accidents [Ref. 17]. To collect sufficient training instances of such events, autonomous vehicles need to run and record hundreds of billions of miles in the wild, corresponding to decades of operating a car on the roads.

Therefore there is a need to generate realistic training data for autonomous vehicles other than operating autonomous vehicles in the real world and collecting data during operation of the autonomous vehicles.

SUMMARY OF THE INVENTION

In one aspect, the present disclosure provides a method for reconstructing three-dimensional video from two-dimensional video data using particle filtering and thereby generating training data for autonomous vehicles.

In another aspect, the present disclosure provides a method in a data processing system including at least one processor and at least one memory, the at least one memory including instructions executed by the at least one processor to implement a vehicle reconstruction system. The method (a) receiving a set of annotations associated with a video frame including a view of at least a portion of a vehicle, each annotation including at least one two-dimensional line, (b) removing at least one outlier from the set of annotations, (c) determining an estimated vehicle model based on the set of annotations, and (d) providing the estimated vehicle model to a driving simulator.

In the method, one of the annotations can be based on input attributed to a human.

In the method, each two-dimensional line can be overlaid on the video frame.

The method can further include receiving a set of bounding boxes associated with the video frame, each bounding box associated with an annotation included in the set of annotations, and the removing at least one outlier from the set of annotations can include determining a target bounding box included in the set of bounding boxes is an outlier, and removing the at least one two-dimensional line included in the annotation associated with the target bounding box from the set of annotations. The determining the target bounding box is an outlier can include determining a second target bounding box included in the set of bounding boxes is a median, determining a percentage of the target bounding box that does not overlap the second target bounding box, and determining that the percentage is below a predetermined threshold. The percentage cam be about fifty percent.

In the method, the at least one two-dimensional line of each annotation in the set of annotations can include a first two-dimensional line associated with a first dimension, a second two-dimensional line associated with a second dimension, and a third two-dimensional line associated with a third dimension. The removing at least one outlier from the set of annotations can include determining a first target two-dimensional line associated with the first dimension and included in the set of annotations is a median, determining that a second target two-dimensional line associated with the first dimension and included in the set of annotations is not within a threshold range of the first target two-dimensional line, and removing the second target two-dimensional line from the set of annotations. The method can still further include determining an interquartile range of all two-dimensional lines included in the set of annotations and associated with the first dimension, and determining the threshold range based on the interquartile range.

In the method, the estimated vehicle model can include a three dimensional volume, a position value, and an orientation value.

In yet another aspect, the present disclosure provides a method in a data processing system including at least one processor and at least one memory, the at least one memory including instructions executed by the at least one processor to implement a vehicle reconstruction system. The method includes (a) receiving a set of annotations including at least two subsets of annotations, each subset of annotations being associated with a video frame included in a set of video frames, each video frame including a view of at least a portion of a vehicle, and each annotation including at least one two-dimensional line, (b) removing at least one outlier from the set of annotations, (c) determining a set of estimated vehicle models based on the set of annotations, each estimated model associated with a video frame in the set of video frames, and (d) providing the set of estimated vehicle models to a driving simulator.

In the method, each estimated vehicle model can be associated with a time step, and each estimated vehicle model can be determined based on a second estimated vehicle model associated with a previous time step.

In the method, each estimated vehicle model can be determined using a recursive Bayesian method. The recursive Bayesian method can be particle filtering. The particle filtering can include generating, for each subset of annotations associated, a plurality of particles, each particle being associated with a cuboid, and determining, for each particle, a probability value based on the at least one two-dimensional line.

In the method, each estimated vehicle model can include a three dimensional volume, a position value, and an orientation value.

In a further aspect, the present disclosure provides a method in a data processing system including at least one processor and at least one memory, the at least one memory including instructions executed by the at least one processor to implement a vehicle reconstruction system. The method includes (a) causing a video frame including a view of at least a portion of a vehicle to be displayed to a plurality of users, (b) causing an option to provide annotations corresponding to the video frame to be displayed to a plurality of users, (c) causing an option to not provide annotations corresponding to the video frame to be displayed to a plurality of users, (d) receiving a number of annotations corresponding to the video frame from the plurality of users, (e) calculating an estimated vehicle model based on the number of annotations, and (f) providing the estimated vehicle model to a driving behavior analyzer.

The method can further include causing an instructional module to be displayed to the plurality of users, the instructional module including instructions to provide at least one first dimensional line along a first dimension and to provide at least one second dimensional line along a second dimension. The instructional module can further include instructions to provide at least one third dimensional line along a third dimension.

The can further include receiving a selection to provide annotations from a group of users, the group of users including at least a portion of the plurality of users, receiving the number of annotations from the group of users. The method can still further include removing at least one outlier from the number of annotations.

These and other features, aspects, and advantages of the present invention will become better understood upon consideration of the following detailed description, drawings and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A shows a view of visualization and annotation interface.

DETAILED DESCRIPTION OF THE INVENTION

Elements of this disclosure could provide methods for generating three-dimensional training data from two-dimensional video data. Abundant video data of such events from municipal traffic cameras and video sharing sites (e.g., YouTube) could provide a potential alternative to recording data in the real world using autonomous vehicles, but generating realistic training data in the form of 3D video reconstructions is a challenging task beyond the current capabilities of computer vision. Crowdsourcing manual annotations of necessary information has the potential to bridge this gap, but the level of accuracy required to attain usable reconstructions makes this a nearly impossible task for non-experts. In this disclosure, we propose a novel crowd-machine hybrid method that uses particle filtering as an aggregation technique that is capable of leveraging temporal dimensional dependencies between video frames. Our particle filtering based method enables more aggressive filtering thresholds, which can help improve the aggregation quality. The proposed method results in a 33% reduction in the relative error of position estimation compared to a state-of-the-art baseline. Moreover, our method enables skip-based (self-filtering) annotation that can reduce the total annotation time for hard-to-annotate frames by 16%. Our approach provides a generalizable means of aggregating more accurate crowd responses even in settings where annotation is especially challenging or error-prone.

As mentioned above, research suffers from a lack of realistic training data, especially of rare and unusual events such as traffic accidents [Ref. 17]. To collect sufficient training instances of such events, autonomous vehicles need to run and record hundreds of billions of miles in the wild, corresponding to decades of operating a car on the roads. To provide a specific example, Waymo's autonomous research vehicles travel and record approximately 25,000 miles every day on public roads [Ref. 2], while Americans drive a total of nearly three trillion miles every day [Ref. 17], a factor of 120 million.

Figure 2:
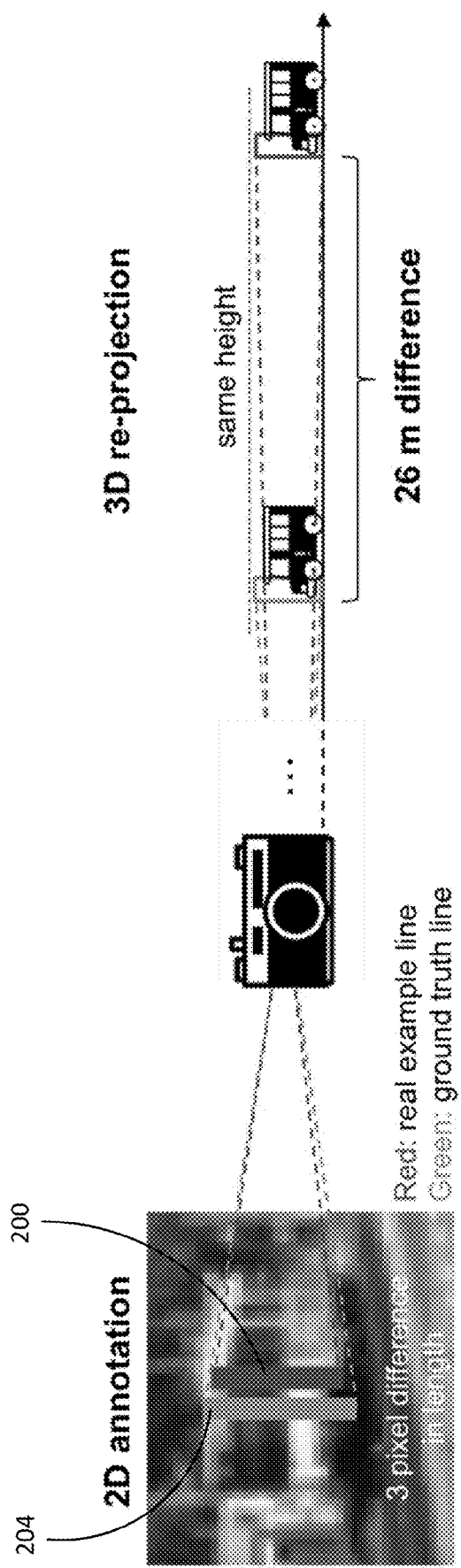
FIG. 2 shows an example of how a three-pixel difference in a two dimensional (2D) annotation of vehicle height can result in a 26-meter difference in 3D position estimation.

Thus, creating realistic simulated 3D scenes [Ref. 1] from abundant existing traffic videos crawled from those available on the Web, such as on YouTube, is a more reasonable method for creating realistic training data of rare events at scale. This process of creating 3D scenes from real-world monocular video is called 3D video reconstruction. Generally, manual annotations are necessary at some point of the process to bridge the sensory and semantic gap between 2D and 3D. To efficiently scale up manual annotation, one can benefit from crowd-powered tools that rapidly leverage human effort. Even though crowdsourcing has been widely studied in image and video annotation tasks [Ref. 5, 24, 40, 43], crowdsourcing techniques for 3D video reconstruction have been underexplored. This is due to the high degree of difficulty of the task, where even a small error in the annotation results in a significant error when re-projected into 3D. For example, as shown in FIG. 2, a three-pixel difference in the 2D annotation of vehicle height can result in a 26-meter difference in 3D position estimation. The vehicle image on the left shows a crowdsourced height entry dimension line annotation 200 and a corresponding ground truth 204. The z-dimension estimate can be calculated from the focal length and the object's actual height, which was 721 pixels and 3.59 meters in our experiment, respectively. The three-pixel difference in dimension line leads to a 26-meter difference in 3D location. Therefore, quality control is a crucial component in both the answer aggregation and 3D state estimation stages to avoid such error amplification. One way to control annotation quality is to filter out as many poor annotations as possible before aggregation. Providing workers an option to skip questions about which they are unsure is known to clean the data at the time of collection [Ref. 8, 34]. We define this action as the self-filtering of worker annotations. Self-filtering can be particularly useful in image and video annotation, as oftentimes it is nearly impossible to generate the correct annotation due to artifacts such as motion blur, change in angle of view, truncation, or cropping in individual frames [Ref. 40]. However, this type of filtering should be handled carefully because it may result in missing annotations, e.g., where all the workers self-filtered, resulting in system failure due to the 3D reconstruction problem being under-determined (there are fewer equations than unknowns).

Figure 1:
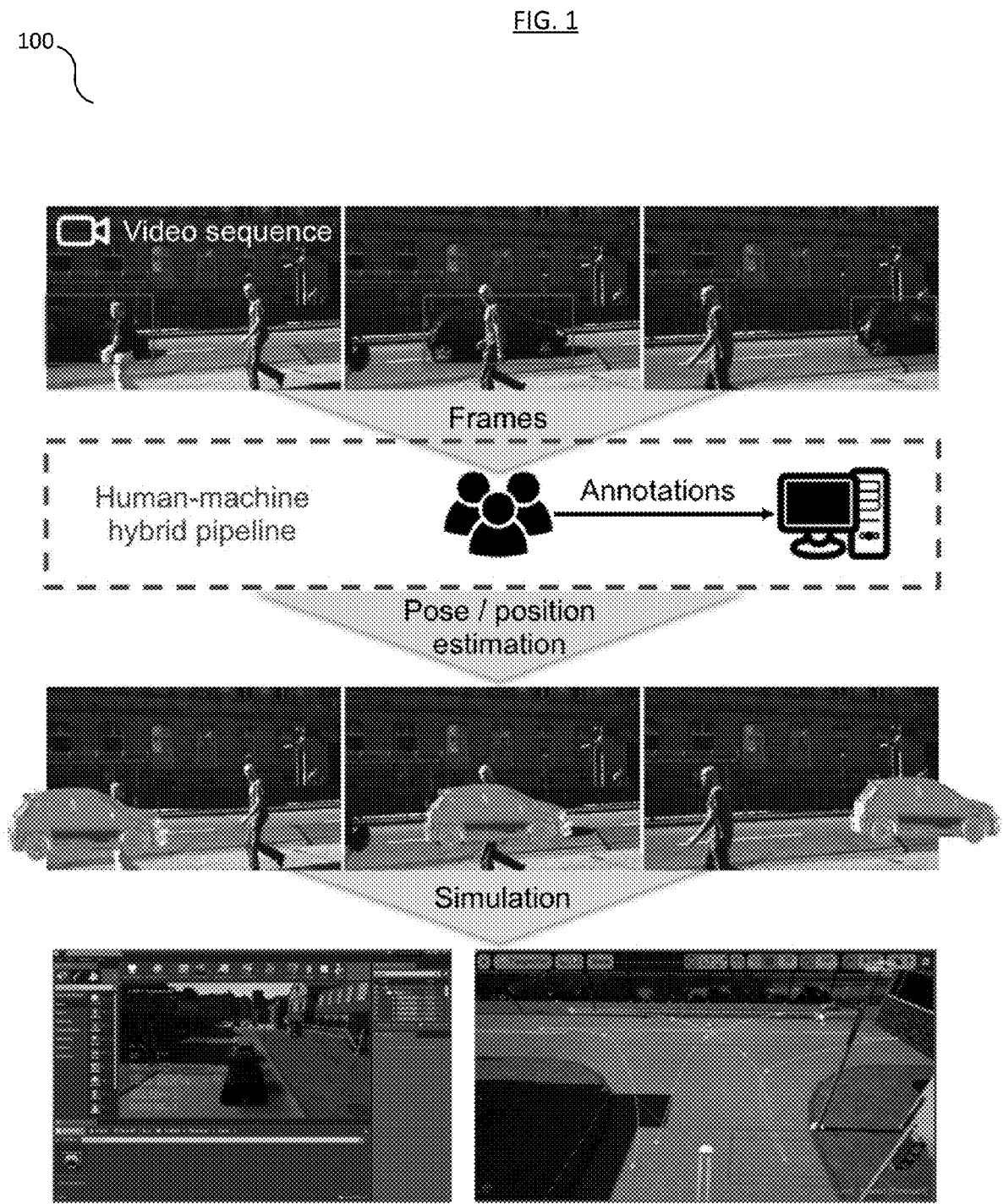
FIG. 1 shows a human-machine intelligence pipeline for 3D video reconstruction.

In this disclosure, we propose a hybrid (human-machine) intelligence pipeline 100 for 3D video reconstruction, as in FIG. 1. Our approach leverages content diversity from different but related video frames to increase the accuracy of 3D state estimates. We use the term 'content' to denote data shown to workers as part of the task instance (here, a frame of the video). Our method uses a particle filter based aggregation strategy to make use of the temporal dependencies of the different frames to complement dropped out answers from workers, which enables 3D reconstruction even when there are "missing" annotations. This ability allows the requester to set more aggressive filtering thresholds for removing annotations, which improves system output accuracy despite the risk of incomplete per-frame annotations. Our disclosure proposes a generalizable solution for crowdsourcing annotations on series of related content, in which we leverage latent-valued invariants to aggregate annotations across differing content.

We introduce Popup, a crowd-powered system, that collects annotations of 3D dimension lines atop 2D videos, and then aggregates these annotations using particle filtering to generate 3D state estimates of objects of interest. We validate our method on videos from a publicly available and established dataset of traffic scenes [Ref. 13]. The experimental results show that our proposed approach reduces the relative error by 33% in position estimation compared to a baseline condition which uses L-BFGS-B [Ref. 44] to optimize re-projection of a 3D cuboid onto each video frame for state estimates. Further, our proposed aggregation method is robust in cases with missing annotations, where the baseline method will fail due to the problem being underdetermined. Lastly, because Popup enables self-filtering, the annotation time for challenging frames can be reduced by 16%. Some contributions of this disclosure are as follows:

(1) A novel means of aggregating and processing multiple annotations at different frames in videos using particle filtering, which enables more accurate 3D scene reconstruction even with an incomplete annotation set.

(2) Popup, a crowd-powered system that estimates 3D position and orientation of objects from 2D images, using crowdsourced dimension line annotations on objects and their actual dimension lengths.

(3) Experimental results from 17 videos annotated by 170 crowd workers that validate the efficiency of our proposed annotation aggregation method that significantly improves the 3D state estimation accuracy and enables quality control through more aggressive filtering thresholds.

Related Work

Crowdsourcing leverages human intelligence via platforms such as Amazon Mechanical Turk to help perform tasks that are otherwise difficult for fully automated systems. The task of reconstructing 3D animations from typical RGB videos can benefit from crowd-powered hybrid pipelines because human computation can provide manual annotations at scale to help the automated system bridge the semantic and sensory gap between 2D and 3D. Our disclosure proposes novel crowdsourcing strategies for collecting and aggregating annotations for 2D to 3D scene reconstruction, which build on previous techniques for crowdsourcing video annotations and improving the quality of aggregated crowd answers.

Crowdsourcing Video Annotations

Crowdsourcing techniques are widely used in visual data annotation in the 2D image-space, such as object segmentation [Ref. 3, 27, 35], object detection [Ref. 15, 36], and visual question answering [Ref. 5, 22] for their efficiency and flexibility. However, the techniques used for static image annotation do not optimally extend to video annotation, as they neglect dependencies in the temporal dimension. This imposes significant additional cost on the task and prevents scaling. Our disclosure focuses on reducing the cost of collecting annotations by improving the aggregation efficiency.

Video annotation systems for some tasks (e.g., activity summary [Ref. 26] or event summary [Ref. 42]) provide a video stream to crowd workers and ask them to provide a summary of the clip based on the query from a requester. Other systems are designed to detect targeted events from a video stream [Ref. 4, 20, 25, 33], letting crowd workers refer to the temporal context to decide the specific moment of the targeted events. Some systems are built for more confined local annotation tasks, such as moving object detection [Ref.

10], object tracking [Ref. 40], object annotation [Ref. 42], or object segmentation [Ref. 19]. Our disclosure contributes to this line of research by introducing a novel method to aggregate confined local annotations across video frames to improve the output quality of subsequent video processing steps. More specifically, we introduce a system that estimates the 3D state—position and orientation—of objects [Ref. 37, 38] using novel collection and aggregation strategies.

Improving the Quality of Aggregated Crowd Answers

Answer aggregation is a challenging problem in crowdsourcing due to the fact that a crowd is typically composed of people with unknown and diverse skills, abilities, technological resources, and levels of understanding of the given task. There are two primary classes of methods for improving the quality of crowdsourced annotations: methods for preventing low quality work at the time of aggregation, and methods for compensating for low quality work at the time of annotation collection [Ref. 21]. Post-hoc compensation for low quality work, such as majority voting on the result or weighting workers based on expectation maximization [Ref. 9, 16], is done after results have been submitted, usually in the aggregation stage. Powerful post-hoc techniques can complement poor quality results in crowdsourced datasets by referring to the agreement between multiple workers. However, because answers exist in a large continuous space, agreement may not be possible in generative tasks such as ours. We introduce a novel answer aggregation technique using particle filtering, which leverages coherency in the temporal dimension to handle noisy and even missing annotations.

Another strategy to improve the quality of aggregated answers is to prevent low quality work before it is submitted, e.g., training workers [Ref. 12], screening workers [Ref. 18], or applying different incentive strategies [Ref. 28]. Recently, skip-based annotation techniques [Ref. 8, 34] have been explored in the labeling domain, which allow crowd workers to self-filter their labels based on their confidence about a question. Revolt [Ref. 8] introduced a collaborative crowdsourcing system that post-processes self-filtered questions and asks workers to discuss with each other the question to reach a consensus. Shah and Zhou [Ref. 34] showed that incentivizing crowd workers to self-filter is the only incentive-compatible payment means possible. Our proposed particle-filtering-based aggregation method enables self-filtering because the missing annotation can be compensated for via temporal coherency.

Approach

To prevent the amplification of annotation errors in 3D state estimates, filtering as many low quality annotations as possible is a necessary step prior to aggregating and estimating the 3D states of objects. However, missing annotations are difficult to handle in the subsequent steps and a specialized treatment is necessary to avoid system failure. Our disclosure is conceptually motivated by inter-frame prediction techniques in video coding [Ref. 41], which takes advantage of temporal coherency between neighboring frames to predict pixel values of missing sub-blocks in subsequent frames.

To exploit this temporal coherency, we developed a particle filter which operates on the crowdsourced data. Particle filtering is a recursive Bayesian method which estimates a probability density function across a state space by maintaining a large set of particles, each of which represents a potential position ("hypothesis"). Particle filters are commonly used in simultaneous localization and mapping (SLAM) systems [Ref. 30, 29], as well as face [Ref. 23], head [Ref. 32], and hand tracking [Ref. 7]. We selected the particle filter as our state estimation technique for three main reasons: first, particle filters can utilize information from neighboring state estimates in tandem with temporal constraints (e.g., the object has a maximum speed) to refine the state estimate. Second, particle filters can support complex measurement functions, which are required to compare 2D annotations and 3D states. Third, the particle filter does not assume an underlying distribution, which allows it to maintain multimodal and non-Gaussian distributions. This is particularly useful, as incomplete annotations cause multiple correct hypotheses. To validate the efficiency of our proposed aggregation and estimation method, we applied two filtering methods for low quality annotations in two different stages: self-filtering at the time of annotation collection and outlier filtering at the time of aggregation.

In this disclosure, we call the act of utilizing temporal dependencies between neighboring video frames inter-frame referencing. This lets us leverage content diversity, where the content (frames) have related information. Related information can be invariant or determined, based on how they vary. In this scenario, camera specification and camera position are invariant information, while content's sampling rate is determined by the requester. We define content diversity as a measure of a given set of content's variation with respect to selected attributes, e.g., the angle of view.

Popup

Figure 4:
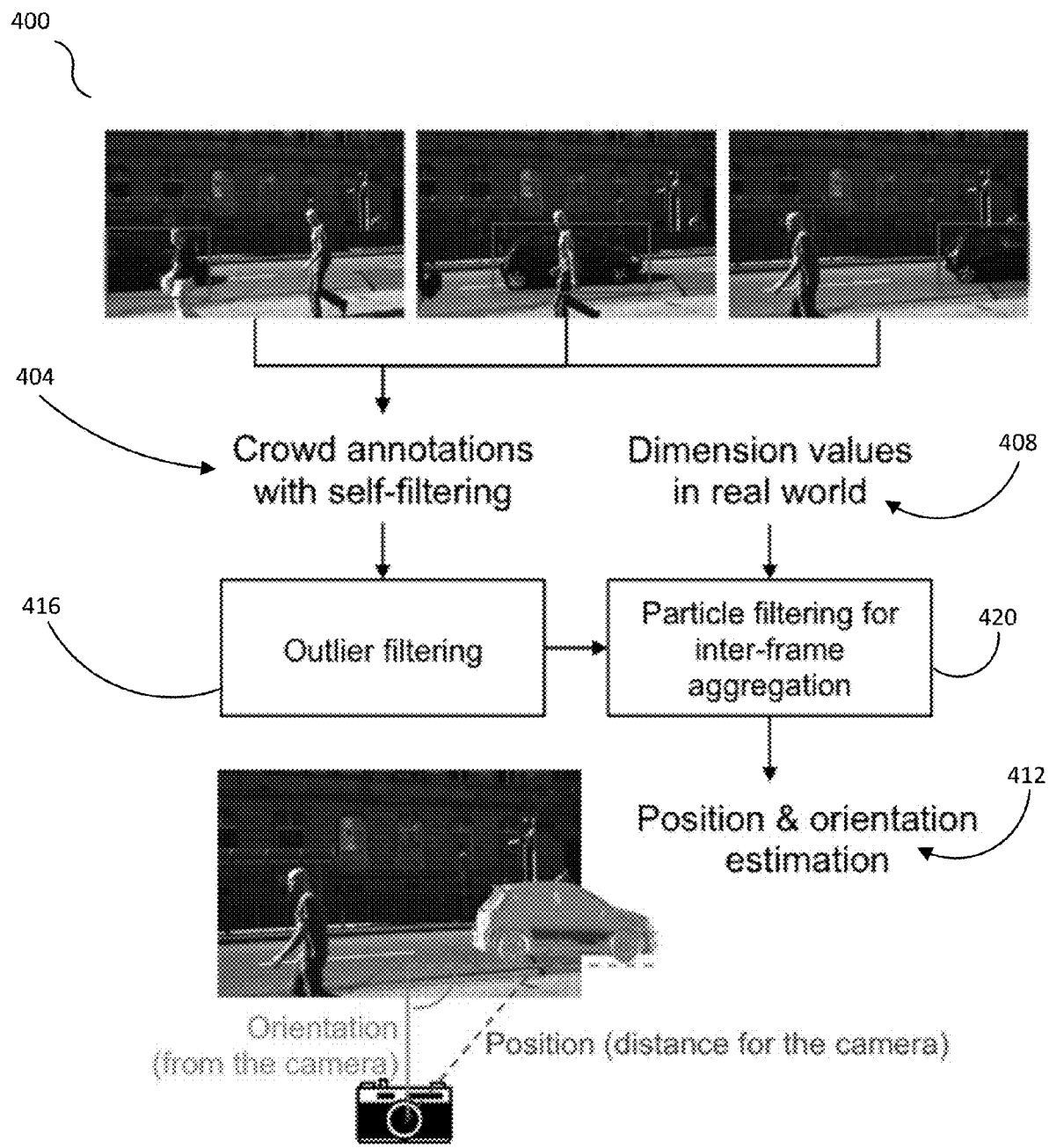
FIG. 4 shows an exemplary workflow in accordance with aspects of the disclosure.

Popup leverages dimension line annotations in 2D videos using particle filtering to achieve efficient and accurate 3D position and orientation estimation. Popup's pipeline includes three main components: (1) dimension line annotation with self-filtering, (2) outlier filtering of submitted annotation sets, and (3) particle filtering based estimation of the 3D position and orientation. The overall pipeline is shown in FIG. 4, which will be described below. By feeding the output from Popup to a simulator such as, CARLA [Ref. 11], a user can reconstruct and replay in 3D an event captured in monocular video. This allows the user to generate large realistic simulated training datasets for data-driven algorithms.

Dimension Line Annotation Tool and Self-Filtering

Figure 3B:
FIG. 3B shows another view of the visualization and annotation interface shown in FIG. 3A.

Referring broadly to FIGS. 3A and 3B, Popup presents crowd workers with a visualization and annotation interface 300 that allows them to crop the object of interest from a video frame and then draw dimension line annotations of the three dimension entries: length, width, and height, on the cropped object. The dimension lines can be directly drawn on objects in one or more video frames 308 to capture the 3D state of an object without any three dimensional interactions, e.g., rotation and scaling of a cuboid, which would require familiarity with interactive 3D tools.

When a crowd worker reviews the dimension line annotation task, an explanation on the goal of the task is given first. Then, step by step instructions are provided with pictures 304 exemplifying desired and undesired annotations as shown in FIG. 3A. The instructions also state that workers should click an "I cannot draw" button 320 whenever they are not confident in drawing accurately for a particular entry. Once the worker accepts the task, they can perform the first step: cropping the target object. The worker can click and drag on the given video frame to draw a box, and use the vertices of the box to adjust the size and ratio. The coordinate information of the box is used in the post-hoc outlier filtering step, as explained in the next section. Once the worker is done cropping the target object, she can click a 'Done with Step 1' button and proceed to the next step. In some embodiments, a worker may only work on annotating a single frame at a time. The sampling rate of frames to be annotated by workers can be arbitrarily determined by the user.

Referring to FIG. 3B, the second step is drawing the dimension line entries (length, width, and height) on the cropped vehicle. The interface can include buttons that open a pop-up window to allow workers to draw dimension line annotations for each dimension entry. Workers can choose which entry they want to draw first. The interface 300 can include an annotation interface 318 such as an interactive pop-up window as shown in FIG. 3B. The annotation interface 318 can include one or more buttons to allow a worker to draw annotation lines on the video frame, and more specifically, the portion of the video frame included in the bounding box. After drawing a line, a popover message appears at the end of the line and asks workers "Is this end closer to the camera than the other end of the line?" The worker can answer this using a radio button. We initially asked this question to avoid the Necker cube illusion [Ref. 31] that occurs when drawing a cube with no visual cues for orientation. The illusion makes it impossible to distinguish the closer ends of the edges of a cube. However, the closer end annotation was not used in our final orientation estimation algorithm due to a large variance in the answers. Nevertheless, we report this step in this disclosure because it affects the total time of completing the dimension line annotation task. The interface forces workers to draw more than one line per dimension in order to proceed to the next step. The interface allows adjusting already drawn dimension lines or redrawing them anytime if needed. Workers are provided with the "I cannot draw" button 320 which they can click on to self-filter dimension line annotations if they are not sure about their answer.

Referring to FIG. 4, an exemplary pipeline (e.g., workflow) 400 is shown. From workers' dimension line annotation input 404 (on a 2D image) and additional input of real-world dimension values 408 of the target vehicle (looked up from an existing knowledgebase), Popup estimates the position and orientation 412 of the target vehicle in 3D using outlier filtering 416 and particle filtering 420.

Outlier Removal

Popup is designed to robustly handle aggressively filtered annotation sets. Popup has two post-hoc filtering modules to control the quality of collected annotations. The post-hoc modules assume multiple submissions per frame so that distribution statistics can be found. The first step uses the median location of the bounding boxes workers cropped from the given frame. The second step uses the standard deviation between the dimension lines drawn for the same object in the same frame.

Step 1: Filtering Annotation Sets

The first step calculates the median bounding box location of submissions to filter incorrect annotation sets. For each target object, the worker crops the object of interest from the given frame. Our assumption is that a malicious worker, careless worker, or bot will fail to crop the correct target object. For width and height independently, if a cropped box does not overlap more than 50% with the median of the cropped boxes we drop the annotation set of all three entries, assuming the worker annotated the wrong object. This is designed to entirely filter poor submissions.

Step 2: Filtering Individual Annotations

The second step compares the distance of the length and angle of submitted dimension line annotations from the medians. If a dimension line is outside 1.5×Interquartile Range (IQR) from the median, it is filtered. This is useful for filtering out mistakes, e.g., a height entry mistakenly drawn as a length entry or a line added by mistake and not removed, and to filter out low quality annotations. We use relative distances instead of absolute values as filtering criteria because the size of an object can differ from 30 pixels to 300 pixels.

Particle Filtering for Position and Orientation Estimation

Popup uses particle filtering as a method for aggregating annotations and estimating 3D states of the target object in the video. A particle filter works by generating many particles, each of which represents a potential state (hypothesis), and using them to track and combine three probability distributions at each time step (video frame) [Ref. 39]:

(1) the previous distribution: where the object was previously;

(2) the transition distribution: where the object could be, given where it was previously; and (3) the measurement distribution: where the object could be, given the crowdsourced lines.

Using these three distributions, the particle filter handles heavily filtered data and provides more refined estimates by leveraging temporal constraints. The particle filter used by Popup embodies these three probability distributions as follows:

(1) Previous State Distribution

The previous distribution corresponds to the final distribution of the previous time step. As we do not have any information about the vehicle's initial pose, we set the distribution at $t=0$ as uniform within the bounds described in the Experimental Setting section.

(2) Transition Distribution

The transition distribution describes the probability of a particle being in a new location given its previous location. This distribution allows the filter to maintain knowledge of potential states across time, which has two important implications: first, it means a fully determined system is not necessary at every time step, so the system is tolerant to self and post-hoc filtering with tight thresholds. Next, it applies a spatiotemporal constraint by limiting how far the vehicle can move in successive frames, narrowing the solution space. Typically the transition distribution is based on knowledge of the vehicle's kinematics and control inputs, but as our system has knowledge of neither, we introduce uncorrelated zero-mean Gaussian noise that spans the set of reasonable vehicle motions.

(3) Measurement Distribution

Figure 5:
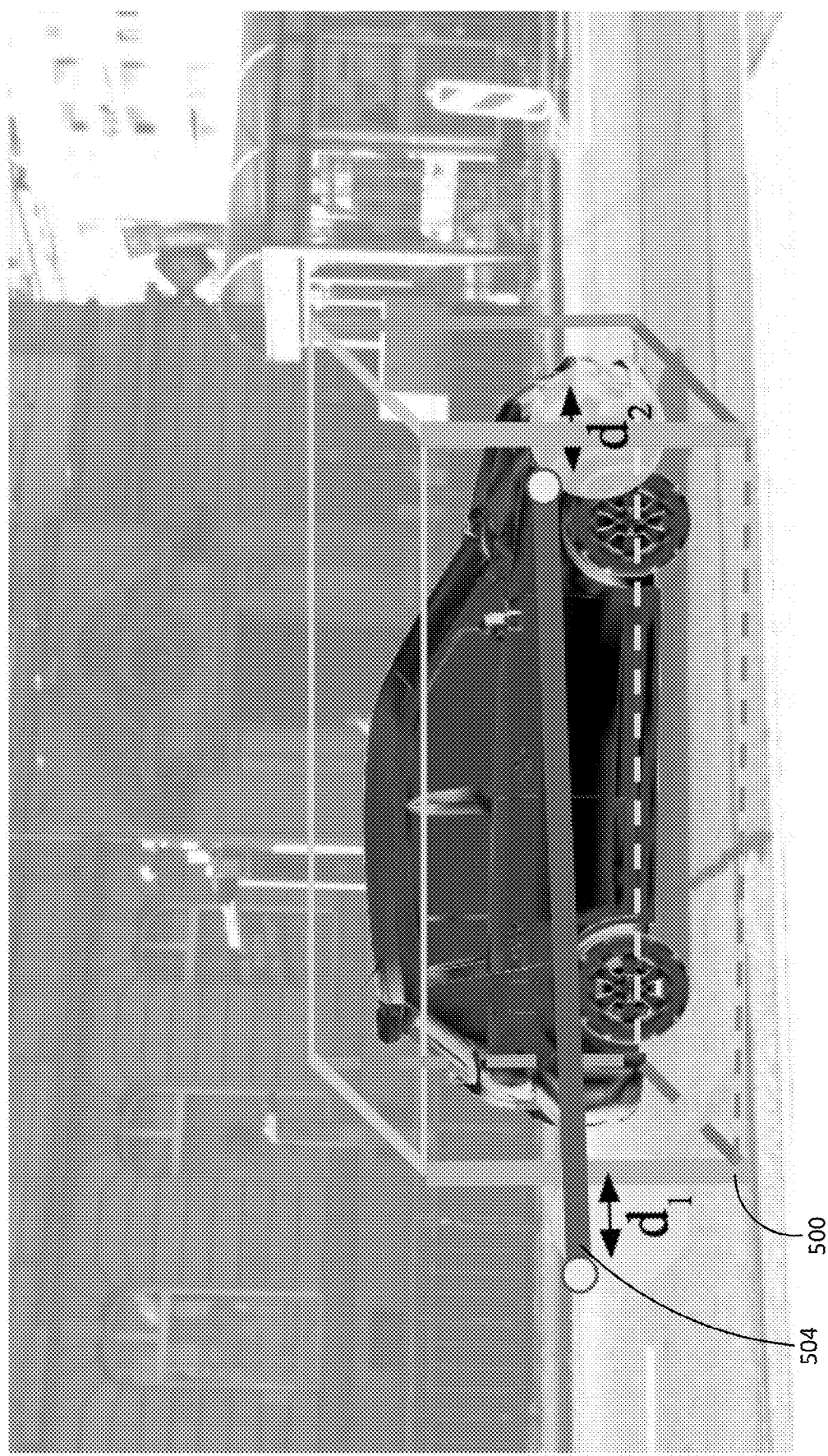
FIG. 5 shows an exemplary bounding cuboid and annotations.

The measurement distribution utilizes the crowdsourced annotation lines to determine the likelihood of the hypothesis. As shown in FIG. 5, to test a hypothesis, we create the bounding cuboid 500 in 3D space and project it onto the image. Then, for each annotation, such as annotation 504, we determine how close the endpoints of the annotation are to an appropriate pair of edges. This distance is then placed on a normal distribution with a mean of 0 pixels and a standard deviation of 22 pixels. We also calculate the difference between the lengths of the annotation line and corresponding projected hypothesis line, and place that on a normal distribution with a mean of 0 pixels and a standard deviation of 22 pixels. The sum of these two probabilities is used as the probability of an annotation. This function is referred to as ERR in Algorithm 1.

Figure 6:
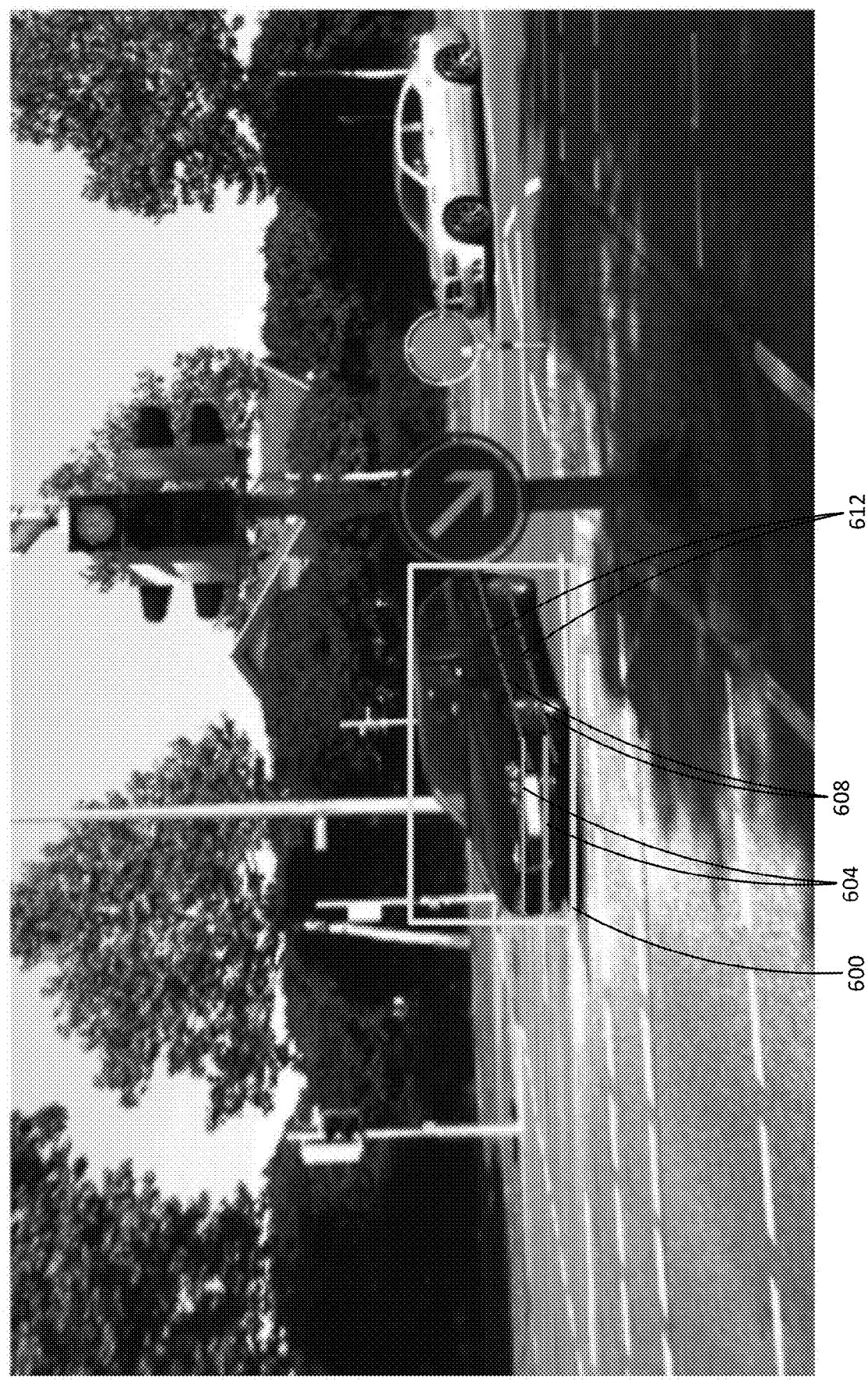
FIG. 6 shows an example of dimension line annotations from a crowd worker.

FIG. 6 shows an example of dimension line annotations from one of the crowd workers who participated in our experiment. A yellow bounding box 600 is the area that the worker cropped in Step 1 of the task as described above, and red lines 604, green lines 608, and blue lines 612 are length, width, and height annotations, respectively, drawn in Step 2 as described above.

Algorithm 1 Particle Filter Algorithm for Popup

Let $S=\{(s_1, w_1) \ldots (s_N, w_n)\}$ be the set of N particles, where each particle $s_i=\{x_i,y_i,z_i,\theta_i,f_i\}$ is one hypothesis with probability $P(s_i)=w_i$. Let the initial set of particles $S_0$ be sampled uniformly from the given range for $s_i$:

```
for Every Frame t do
    RESAMPLE(S)
    for Every (s_i, w_i) in S do
        Next State Step: s_{i,t} ← s_{i,t−1} + N (0, σ)
        z ← 0
        for Every Annotation Line do
            z ← z + ERR(AnnotationLine, ParticleState)
        end for
        w_{i,t} = w_{i,t−1} · z
    end for
    S ← NORMALIZE(S)
    estimate ← ARGMAX (w_i)
end for
```

Implementation

The pseudocode for our system is shown in Algorithm 1. Our state space includes five dimensions: x, y, z, θ and f, where x, y, z denote the relative 3D location of an object from the camera and θ denotes the orientation as illustrated at the bottom of FIG. 4. The last dimension, f, denotes the focal length of the camera. When analyzing across a single frame, we perform the action and resampling steps after iterating through every set of annotations.

Figure 7:
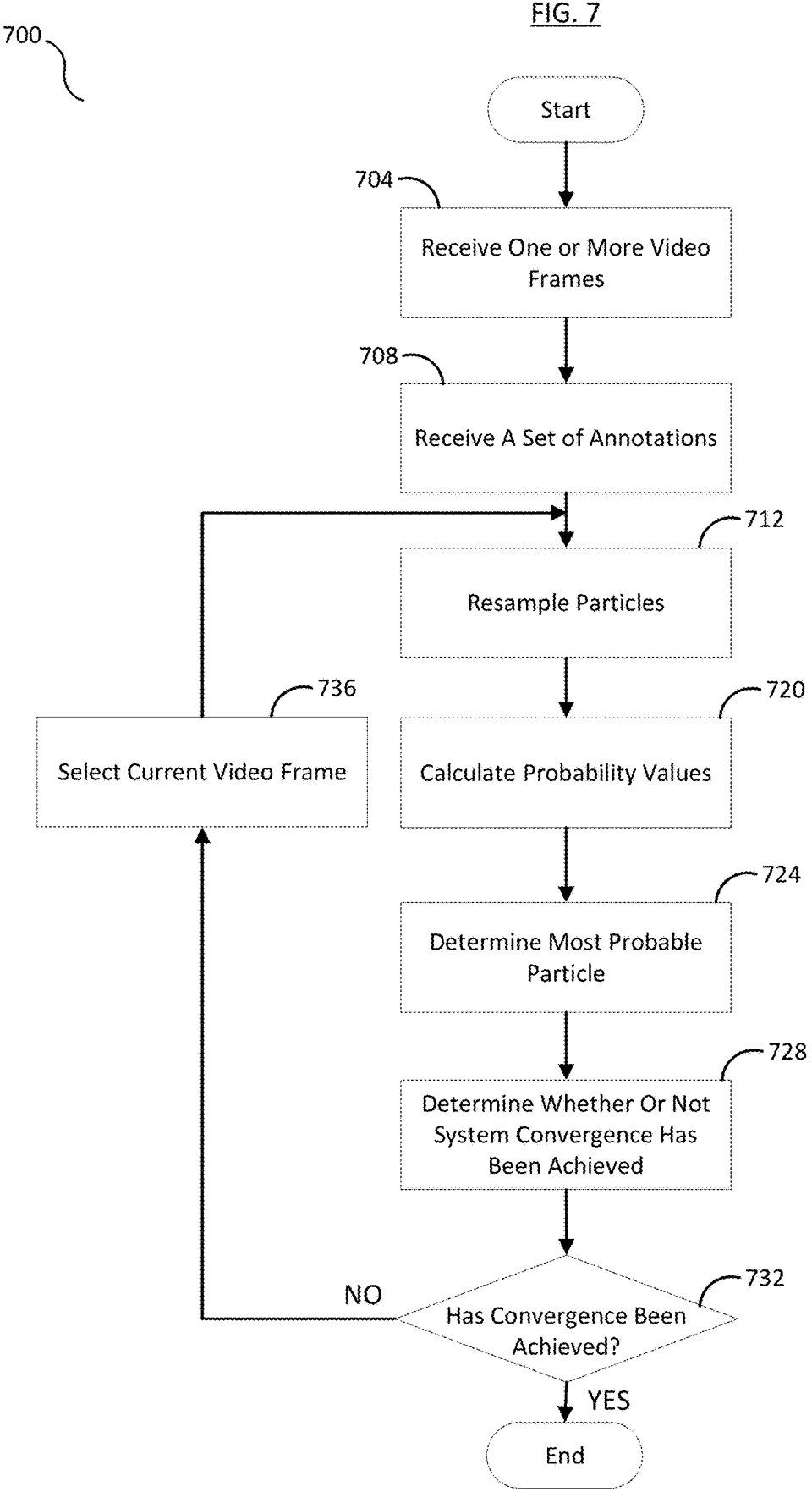
FIG. 7 shows a process for implementing a particle filtering method.

Referring now to FIG. 7, a process 700 for implementing the particle filtering method of Algorithm 1 above is shown.

At 704, the process 700 can receive one or more video frames. Each video frame can include a view of at least a portion of a vehicle. The process can then proceed to 708.

At 708, the process 700 can receive a set of annotations. The annotations can include two-dimensional lines associated with a dimension, such as length, width, or height. Each two-dimensional line can also be associated with a video frame included in the one or more video frames. The process can then proceed to 712.

At 712, the process 700 can resample the set N of particles described above. The process 700 can resample the set N of particles in order to help determine a probable location of a vehicle in a current video frame (i.e., a video frame the process 700 is currently processing). The current video frame is one video frame included in the one or more video frames. As described above, each particle $s_i$ can include a hypothesis value including three dimensional location values $x_i,y_i,z_i$, an orientation value $\theta_i$, and a focal length value $f_i$. Each particle can include a probability value $w_i$ indicating an estimated probability of the hypothesis. Initially, for the first time a first video frame included in the one or more video frames has been sampled, the particles can be sampled uniformly. The process 700 can then proceed to 720.

At 720, the process 700 can calculate a probability value (e.g., a weight value) for each of particles. The process 700 can generate a bounding cuboid based on the hypothesis value in three-dimensional space, and project the cuboid onto the video frame. Then, for each two-dimensional line associated with the current video frame, the process 700 can determine a first distance between endpoints of the two-dimensional line and an appropriate pair of edges of the cuboid. The first distance is then placed on a normal distribution with a mean of 0 pixels and a standard deviation of 22 pixels. The process 700 can also calculate a second difference between the lengths of the annotation line and corresponding projected hypothesis line, and place the second difference on a normal distribution with a mean of 0 pixels and a standard deviation of 22 pixels. The process 700 can then calculate the probability value as equal to a sum of the probabilities of the first distance and second distance based on the normal distributions. The process 700 can then proceed to 724.

At 724, the process 700 can determine a most probable particle based on the probability values calculated above. The process 700 can normalize the particles and then determine the highest probability value of the particles. The particle with the highest probability value can then be used to generate an estimated vehicle, as will be explained below. The estimated vehicle can be associated with the current video frame. The process can then proceed to 728.

At 728, the process 700 can determine whether or not system convergence has been achieved. A video consisting of a series of video frames may need to be iterated through several times forward and backward in order to achieve convergence. In some embodiments, the process can determine if the process 700 has iterated through each video frame included in the one or more video frames a predetermined number of times (i.e., performed steps 712-724 a predetermined number of times for each video frame). If every video frame has been iterated through the predetermined number of times, for example four times, the process 700 can determine that system convergence has been achieved. If the predetermined number has not been iterated through the predetermined number of times, the process 700 can determine that system convergence has not been achieved. The process can then proceed to 732.

At 732, if the process 700 determined that system convergence has not been achieved (e.g., "NO" at 732), the process 700 can proceed to 736. If the process 700 determined that convergence has been achieved (e.g., "YES" at 732), the process 700 can proceed to end.

At 736, the process 700 can select the current video frame from the one or more video frames. The process 700 can select the current video frame to be the video frame included in the one or more video frames that follows the current video frame chronologically. The process 700 may iterate through the one or more video frames in reverse chronological order after the video frames have been iterated through in chronological order. When iterating in reverse chronological order, the process 700 can select the current video frame to be the video frame included in the one or more video frames that is chronologically before the current video frame. The process 700 can alternately iterate through the video frames in chronological order and reverse chronological order until convergence has been achieved. The process 700 can then proceed to 712.

Evaluation

To evaluate the performance of our proposed 3D video reconstruction strategy, we investigated the accuracy of dimension line annotations before and after pre-processing filterings: self and outlier filtering. Next, we investigated our proposed annotation aggregation strategy that uses particle filtering to refer to neighboring frames. For the experiments, we recruited 170 workers using LegionTools [Ref. 14] and routed them from Amazon Mechanical Turk to our crowd-powered system, Popup.

Experimental Setting

The evaluation is done using the KITTI dataset [Ref. 13] that contains traffic scenes recorded from a moving vehicle using multiple sensor modalities. Along with 2D RGB video scenes, the dataset provides ground truth measurements of distance and orientation of objects relative to the camera. The scenes include occluded, truncated, and cropped objects that are challenging and thus appropriate to test the performance of Popup.

In this experiment, we targeted reconstructing the 3D state of one moving vehicle per video clip. There were a total of 21 video clips in the dataset, of which we used 17, dropping unfit ones. We sampled 10 frames from each video clip at a rate of 2 frames per second. For each video clip, we recruited 10 workers to provide annotations. Each worker annotated every other sampled frame, for a total of five frames. That is, for each frame, annotations from five different workers were collected. Each worker was paid $1.10 per task to meet a pay rate of ~$9/hr. To understand the reason for self-filtering whenever it happens, we gave the workers a multiple-choice question on why they self-filtered. The choices were: 1) "The object is heavily occluded", 2) "I don't understand the instruction", and 3) "Others". We asked the workers to still draw the dimension line after reporting "I cannot draw" to directly compare accuracy with and without workers' self-filtering.

To obtain the required 3D dimensions of the annotated vehicles, we utilized the ground truth information included in the KITTI dataset. In a real world deployment of Popup, the dimensions would be found online or in appropriate documentation prior to generating the 3D reconstruction. To reduce computation time and avoid suboptimal estimation, we set bounds for each estimated dimension: $-30 \leq x \leq 30$, $-4 \leq y \leq 4$, $1 \leq z \leq 140$, $0 \leq \theta < \pi$, and $500 \leq f \leq 1000$. Position is given in meters, orientation in radians, and focal length in pixels. We used 50,000 particles for all the particle filtering based conditions.

Figure 8:
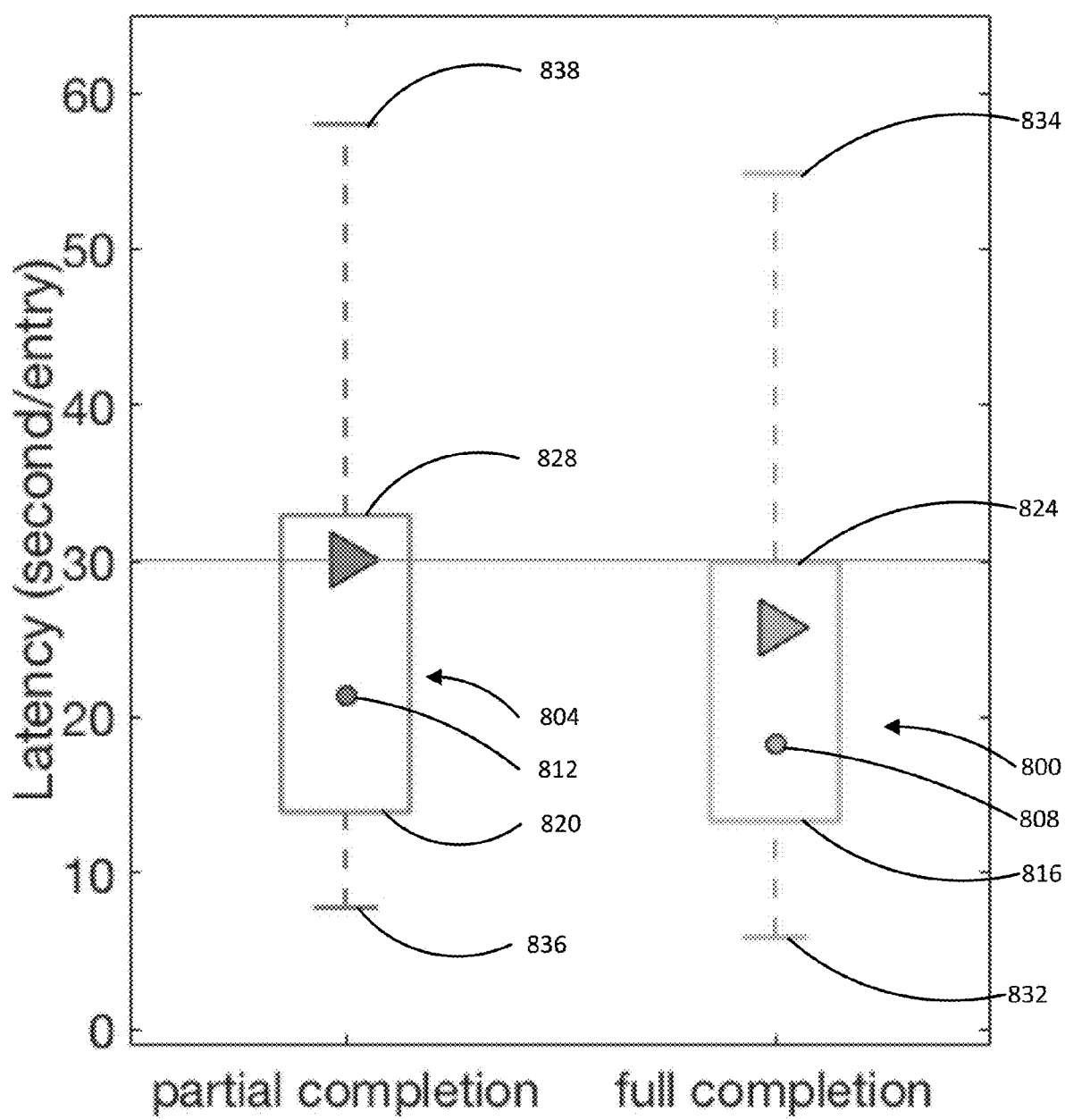
FIG. 8 shows a graph of average latency of partial and full annotation completion.

FIG. 8 shows a graph of the average latency of partial and full annotation completion. A first box plot 800 represents the full completion represents typical entries—entries where no worker self-filtered. A second box plot 804 represents the partial completion entries in which at least one worker self-filtered. The partial completion entries took an average of 16% more time to annotate (p<0.005). For each box plot 800, 804, a circle 808, 812 denotes the median and the triangle denotes the mean. Lower edges 816, 820 and upper edges 824, 828 of the box plots 800, 804 denote the 25-th and 75-th percentiles. Whiskers 832, 834, 836, 838 extend to the most extreme data-points not considered to be outliers.

Results from Dimension Line Annotation

In this section, we present our experimental results in collecting 3D dimension line annotations in 2D videos using the crowd worker interface of Popup. We report the rate of removed annotation sets and individually dropped annotations in the outlier filtering steps. We also report the rate of annotations dropped in the self-filtering step. Then, the average accuracy of dimension line annotations with and without our pre-processing filtering to drop poor annotations is reported. Lastly, we show the positive effect of self-filtering on latency in data collection.

Ratio of Filtering Annotation Sets

The first outlier filtering step removed low quality annotation sets based on bounding box coordinates, and filtered 7% of 850 submissions. We found that few incorrect objects (under 2%) remained after the filtering step, which typically occurred when the majority of workers (at least three out of five) annotated an incorrect object.

Ratio of Self-Filtering

Figure 9A:
FIG. 9A shows an exemplary video frame in which 80% of workers self-filtered.
Figure 9B:
FIG. 9B shows another exemplary video frame in which 80% of workers self-filtered.
Figure 9C:
FIG. 9C shows another exemplary video frame in which 100% of workers self-filtered.

After the first step of outlier filtering, 793 annotation sets remained in the collection. Each annotation set had three dimension entries (length, width, and height), resulting in a total 2379 entries submitted. Among the submissions, the number of self-filtered entries was 176, which were 7% of the total submitted dimension line entries. Of the self-filtered entries, 34% were filtered for the reason "The object is heavily occluded", and 66% were filtered for the reason "Others". There were no instances where the "I don't understand the instruction" option was chosen. When the "Others" option was chosen, workers could manually enter the reason behind their decision. Most explanations were related to insufficient visual information, e.g., "the object runs off the given image", "it's mostly back view", and "Bad angle, low resolution." FIGS. 9A-9C show exemplary frames in which more than 60% of the workers self-filtered. FIG. 9A shows an exemplary frame in which 80% of workers self-filtered and selected the "no side view" option. FIG. 9B shows an exemplary frame in which 80% of workers self-filtered and selected the "occluded" option. FIG. 9C shows an exemplary frame in which 100% of workers self-filtered and selected the "low resolution" option. We initially expected a higher self-filtering rate because we intentionally included scenes that are hard to annotate, e.g., truncated and occluded objects. In the discussion section, we discuss the potential reasons for the low self-filtering rate.

Ratio of Filtering Individual Annotation

In the final outlier filtering step, we filtered individual annotations based on the dimension line's length and angular distance from the median. Of the individual annotations, 13% were considered outliers and filtered from the collection. We found that a few (under 3%) outlier annotations did not get filtered with our method. These were cases where the object was relatively small in the scene, and the variance within good annotations was very close to the variance between good and bad annotations.

Accuracy of Dimension Line Annotations

We examined the effect of pre-processing filtering on the average accuracy of dimension line annotations. Since the dimension line ground truth is not provided by the KITTI dataset, we projected the actual vehicle height of the target vehicle onto the image plane, and compared the difference from the projected height line with the annotated dimension line in pixels. This analysis was not performed on width and length dimension lines as they are not parallel to the image plane. In our experiment, the distributions were all approximately normal, but with positive skew. Because the distributions were skewed, we computed p-values using Wilcoxon Rank-Sum test.

Figure 10:
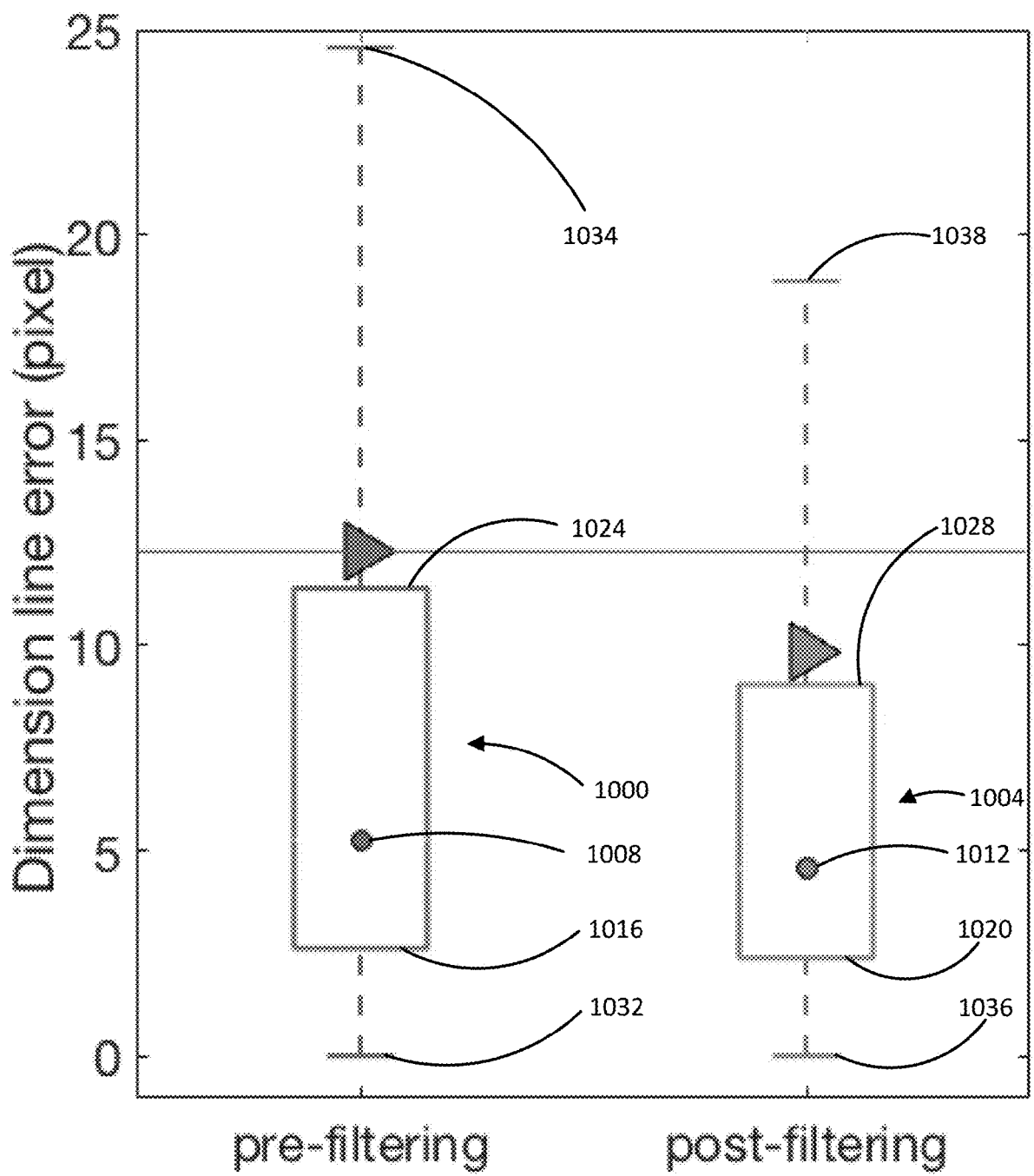
FIG. 10 shows a graph of height dimension line error without self-filtering and with self-filtering.

As shown in FIG. 10, the filtering reduced the average error of dimension lines by 20% (p<0.05) on average. More specifically, FIG. 10 shows a graph of height dimension line error of two different conditions, with lower error being better. A first box plot 1000 of an approach without any filtering and a second box plot 1004 of an approach with both outlier and self-filtering are shown. After filtering, the average error was reduced by 20% (p<:05). For each box plot 1000, 1004, a circle 1008, 1012 denotes the median and the triangle denotes the mean. Lower edges 1016, 1020 and upper edges 1024, 1028 of boxes denote the 25-th and 75-th percentiles. Whiskers 1032, 1034, 1036, 1038 extend to the most extreme data-points not considered to be outliers. Note that the mean error after filtering is under 10 pixels (9.8 pixels). Considering that the frame heights are 3105-pixel, the average error is under 3% of the full height of a frame.

Time Savings from Self-Filtering

We investigated the average latency of partial and full annotation completion. Partial completion is defined as where at least one worker self-filtered, representing challenging entries. Full completion is defined where no worker self-filtered, representing typical entries. Because the distributions were skewed normal, we computed p-values using Wilcoxon Rank-Sum test. As shown in FIG. 8, we found annotations took approximately 16% longer for partial completions (p<0.005). The result suggests that two things: first, self-filtering can reflect a worker's confidence level as we intended in the design stage. We can reduce total latency in annotation collection if we encourage workers to self-filter the challenging entries, because they can save time on the drawing activity by skipping them. That is, we can save 16% of the annotation time for the hard annotations if the self-filtering option is provided.

Results from Aggregation and State Estimation

In this section, we evaluate our proposed annotation aggregation and state estimation method under different conditions by comparing it against the ground truth from the KITTI dataset [Ref. 13]. For all evaluations, we dropped outliers; any data point outside 1.5× Interquartile Range (IQR) was removed for fair comparison between conditions.

Evaluation Metrics

For the evaluation of the accuracy of the state estimates, we used two metrics: a distance difference metric, and an angular difference metric. The distance difference metric is the Euclidean distance between the ground truth and the estimate. The angular difference metric corresponds to the smallest angular difference between estimated orientation and the ground truth orientation (Equation 1):

$$\text{DistanceDiff} = \sqrt{(x_g-x_e)^2+(y_g-y_e)^2+(z_g-z_e)^2}$$

$$\text{AngularDiff} = |(\theta_g-\theta_e)\% \pi/2| \quad (1)$$

where $x_g$, $y_g$, and $z_g$ are the 3D ground truth, $x_e$, $y_e$, and $z_e$ are the 3D state estimate, $\theta_g$ is the ground truth orientation, and $\theta_e$ is the orientation estimate.

Baseline and Conditions

To assess the success of the proposed inter-frame aggregation and 3D state estimation strategy, we compare the performance of our particle filtering based method with a state-of-the-art baseline method that uses geometric reprojection and L-BFGS-B [Ref. 44] optimization. Note that the baseline cannot leverage content diversity because it does not utilize the temporal dependencies between different video frames (contents). For convenience, we will define the ability to utilize the temporal dependencies between different frames as inter-frame referencing, in contrast to intra-frame referencing. The two conditions that are compared to the baseline method are (1) particle filtering without inter-frame referencing and (2) particle filtering with inter-frame referencing. In addition, we look at the performance difference in window sizes for inter-frame referencing: using three, five, and ten frames as window size.

Baseline: The baseline method reprojects the 3D cuboid onto a given video frame and compares the corner location of the reprojection with the endpoints of the average dimension lines drawn for the target vehicle. This comparison is used as the cost function, and the L-BFGS-B optimization method [Ref. 44] is used for minimization. L-BFGS-B is a well-studied optimization algorithm that is used in the state-of-the-art techniques for estimating distributions in various applications, e.g., medical image processing and computer graphics. The baseline method cannot handle cases where a whole entry (e.g., all height, length, or width annotations) is missing. The baseline method breaks in this condition because the optimization problem becomes underdetermined. Since the baseline method cannot refer to other frames' annotations by utilizing spatiotemporal constraints, the baseline was only run for single frame based estimation.

C1. Particle filter without inter-frame referencing: For a fair comparison with the baseline, this condition runs the particle filtering algorithm without referring to other frames. Since this condition does not refer to other frames, the solution is underdetermined under the same conditions as the baseline. The comparison between the baseline and this condition emphasizes the effect of using inter-frame referencing which is enabled by the proposed particle filtering based annotation aggregation in the next condition.

C2. Particle filtering with inter-frame referencing: The strength of using particle filtering is that it can leverage content diversity by referring to information from other frames to complement missing annotations. For this condition, we first evaluate the performance of different window sizes for inter-frame referencing: three, five, and ten. After evaluating the performance of different window sizes, we compare the state estimate performance of the best window size with the baseline performance.

Evaluation 1: Particle Filter without Inter-Frame Referencing

Figures 11A, 11B:
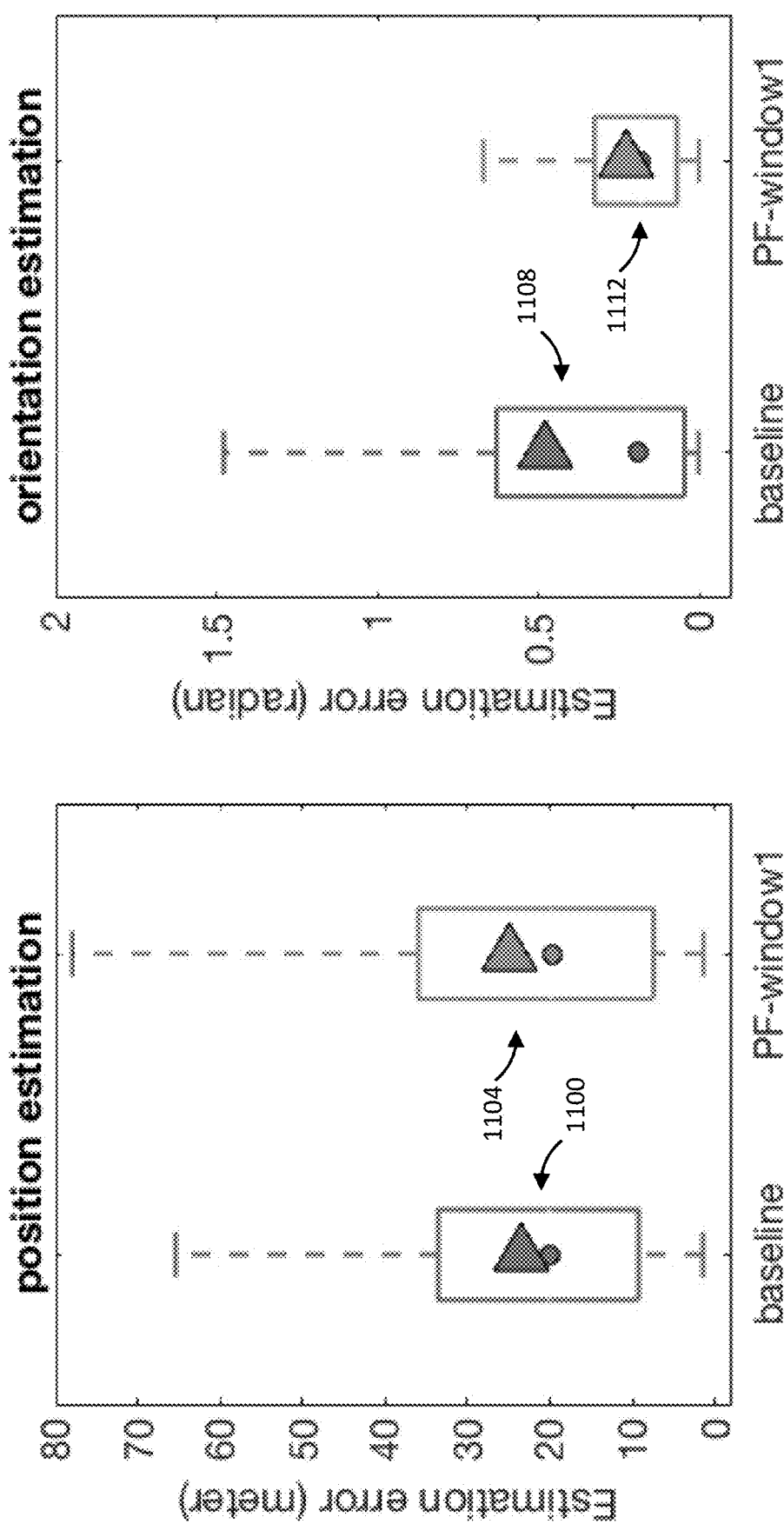
FIG. 11A shows a graph of a box plot of position estimation performance of a baseline method and a box plot of position estimation performance of particle filtering without inter-frame filtering conditions.
FIG. 11B shows a graph of a box plot of orientation estimation performance of the baseline method of FIG. 11A and a box plot of the orientation estimation performance of particle filtering without inter-frame filtering conditions.

To evaluate the performance of the particle filtering method, we compared the performance of condition C1 with the baseline. FIG. 11A shows a graph of a box plot 1100 of the position estimation performance of the baseline and a box plot 1104 of the position estimation performance of particle filtering without inter-frame filtering conditions (i.e., condition C1). FIG. 11B shows a graph of a box plot 1108 of the orientation estimation performance of the baseline and a box plot 1112 of the orientation estimation performance of particle filtering without inter-frame filtering conditions (i.e., condition C1).

Evaluation results are presented as box and whisker plots throughout this section, as the distributions were all approximately skewed normal with positive skew. Because they were skewed, we computed p-values using Wilcoxon Rank-Sum test. The summarized result shows that in terms of position estimation, the baseline and the proposed particle filtering method perform similarly (no significant difference was found). In terms of orientation estimation, we observed a 53% (p=0.11) lower mean for our proposed particle filtering method compared to the baseline. However, while the effect size was medium-large (d=0.65), the results were only approaching statistical significance (p=0.11). We assume that the difference in performance comes from how the two methods incorporate dimension line evidence. The baseline method averages given dimension lines, and considers the average as an edge of the 3D re-projected cuboid to minimize the difference from the projection and the dimension lines. In contrast, the particle filtering based method does not compute an average, but compares each dimension line to the 3D re-projected cuboid to update the orientation estimation. This enables retaining information from all given dimension line annotations. Overall, the result implies that without inter-frame referencing, our proposed method is comparable to the state-of-the-art baseline.

Evaluation 2: The Effect of Inter-Frame Referencing

Figure 11D:
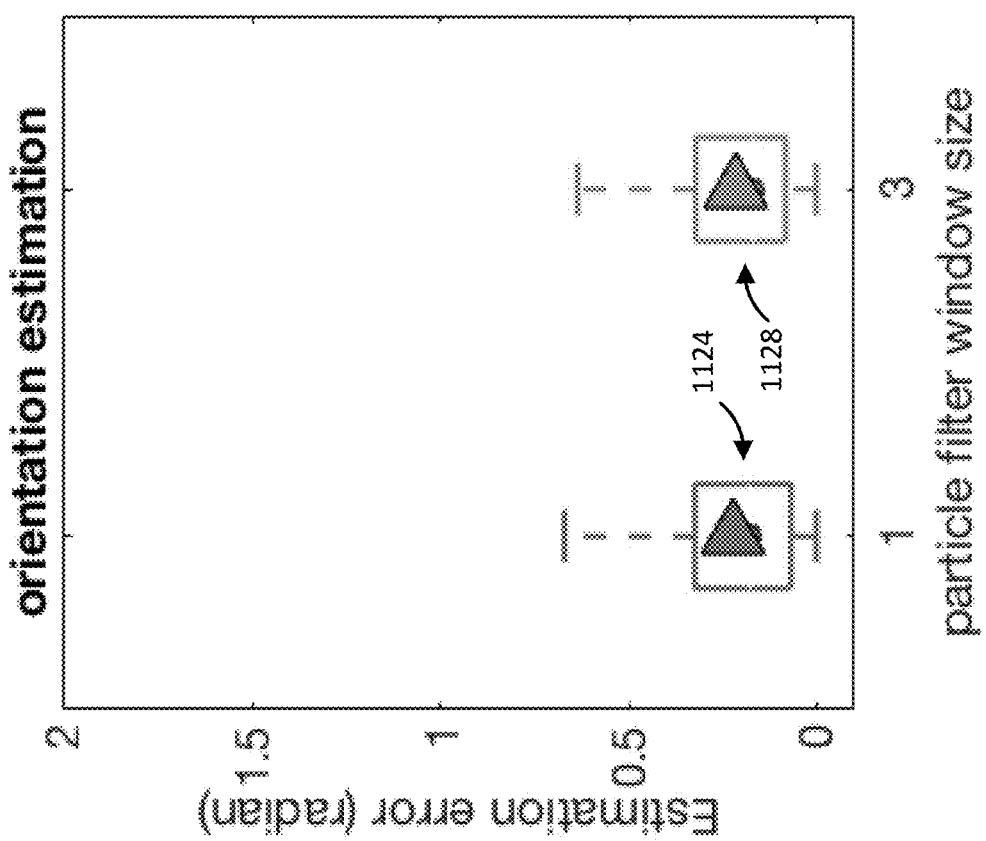
FIG. 11D shows a graph of a box plot of orientation estimation performance of particle filtering without inter-frame filtering conditions and a box plot of orientation estimation performance of particle filtering with inter-frame filtering conditions with a window size of three.
Figure 11C:
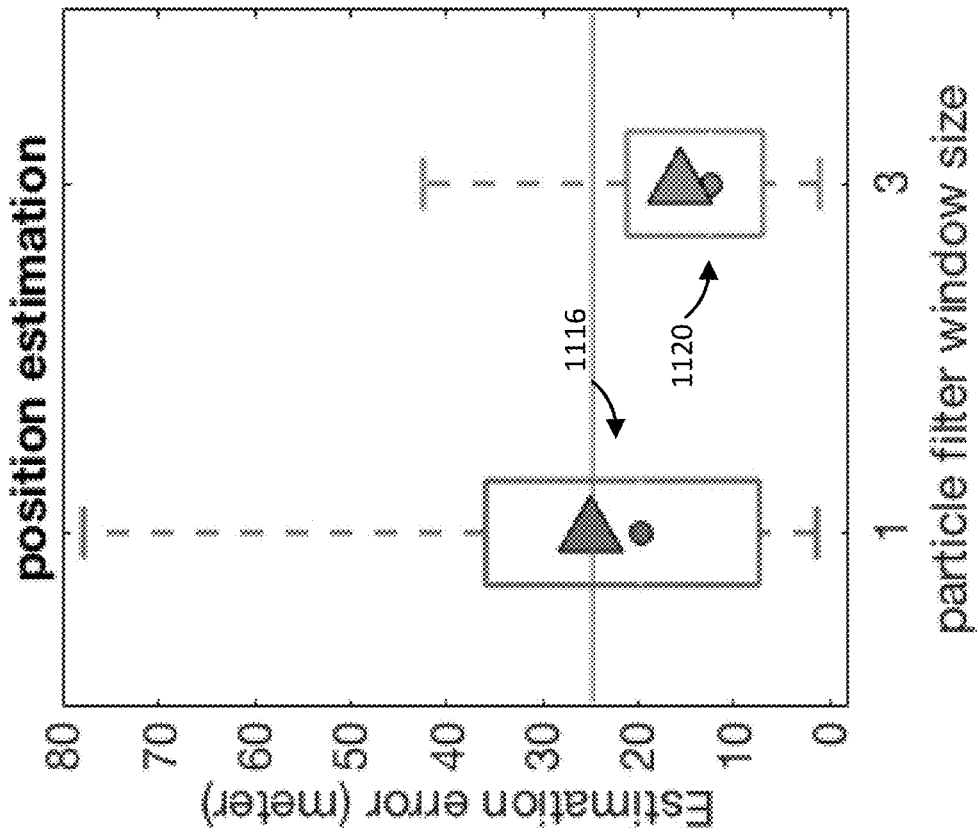
FIG. 11C shows a graph of a box plot of position estimation performance of particle filtering without inter-frame filtering conditions and a box plot of position estimation performance of particle filtering with inter-frame filtering conditions with a window size of three.

The primary strength of using particle filtering based estimation is in that we can leverage content diversity of different video frames and refer to other frames' state estimates when estimating the current frame's state. This allows us to fill in the missing information caused by either outlier-filtering or self-filtering. We looked at three different window sizes and window size of three frames had the lowest average state estimate error. Therefore, our comparisons against single-frame particle filtering (without inter-frame referencing) was performed with this window size. FIG. 11C shows a graph of a box plot 1116 of the position estimation performance of particle filtering without inter-frame filtering conditions (i.e., condition C1) and a box plot 1120 of the position estimation performance of particle filtering with inter-frame filtering conditions (i.e., condition C2) with a window size of three. FIG. 11D shows a graph of a box plot 1124 of the orientation estimation performance of particle filtering without inter-frame filtering conditions (i.e., condition C1) and a box plot 1128 of the orientation estimation performance of particle filtering with inter-frame filtering conditions (i.e., condition C2) with a window size of three.

The summarized result in FIGS. 11C-11D shows that referencing to three neighboring frames (including the current frame) results in 37% improved accuracy compared to not referring to neighboring frames in terms of position estimation (p<0.001). However, orientation estimation accuracy did not improve by referring to neighboring frames.

Evaluation 3: Baseline Vs. Proposed Method

Figure 11F:
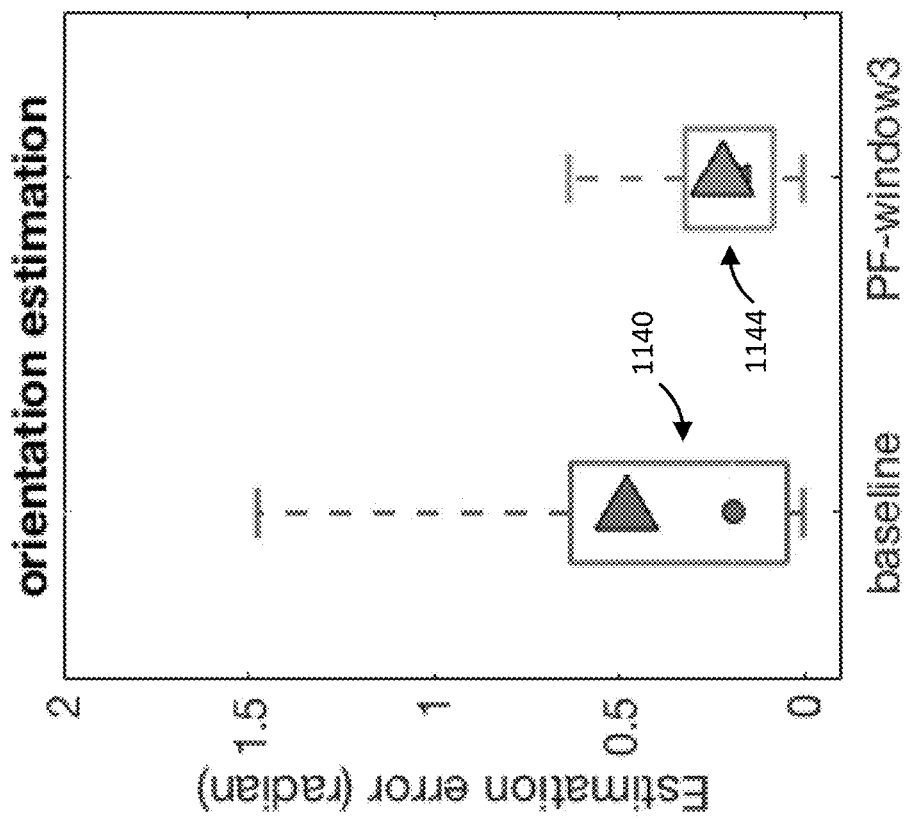
FIG. 11F shows a graph of a box plot of the orientation estimation performance of the baseline method of FIGS. 11A-B and FIG. 11E, and a box plot of the orientation estimation performance of particle filtering with inter-frame filtering conditions with a window size of three.
Figure 11E:
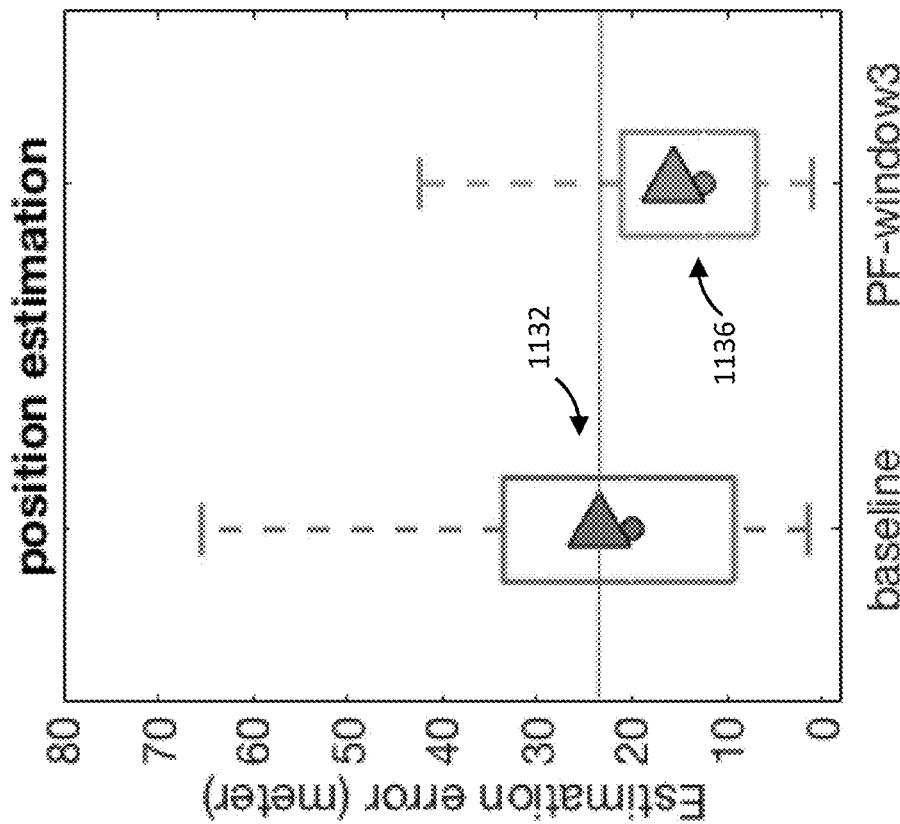
FIG. 11E shows a graph of a box plot of position estimation performance of the baseline method of FIGS. 11A-B and a box plot of position estimation performance of particle filtering with inter-frame filtering conditions with a window size of three.

To evaluate the performance of Popup, we compare the baseline result with Popup using three frame referencing—the best performing window size tested. FIGS. 11E-11F show the position and orientation estimation results. FIG. 11E shows a graph of a box plot 1132 of the position estimation performance of the baseline and a box plot 1136 of the position estimation performance of particle filtering with inter-frame filtering conditions (i.e., condition C2) with a window size of three. FIG. 11F shows a graph of a box plot 1140 of the orientation estimation performance of the baseline and a box plot 1144 of the orientation estimation performance of particle filtering with inter-frame filtering conditions (i.e., condition C2) with a window size of three. In terms of position estimation, the average error was reduced by 33% (p<0.001). In terms of orientation estimation, the average error was reduced by 54%, but with low confidence, as the results were only approaching statistical significance (p=0.105). The result shows that the proposed aggregation and estimation strategy for crowdsourcing image annotations in videos can handle noisy and incomplete annotation sets, and also outperform the state-of-the-art baseline condition in terms of position estimation.

Discussion

In this section, we discuss the effect of inter-frame referencing in video annotation, factors that can affect workers' self-filtering behavior, and factors affecting the final 3D estimation quality.

Inter-Frame Referencing in Video Annotation

The evaluation results show that referencing annotations from neighboring frames can increase estimation accuracy in video annotation tasks. We tested four different window sizes, and found that the window size affected the impact of inter-frame referencing. For position estimation, windowing seemed to improve the state estimate accuracy, but the effect was not linear, being maximized at three-frame window. For orientation estimation, the performance was consistent from window size one to five. The performance largely degraded for the 10-frame window. We speculate that the reason we did not observe progressive improvement in accuracy with increased window size is because of propagation of bad annotations. If one frame is poorly annotated, it will affect all other frames within the window. It follows that a larger window size allows local errors to affect more frames, which results in a larger aggregated overall error. For example, a critical error in frame k will affect only frame k−1 and k+1 in a three-frame window, but will affect all 10 frames in a 10-frame window.

Leveraging Content Diversity in Annotation Tasks

Our proposed method presents a new paradigm for crowdsourced annotation tasks that efficiently collects and aggregates annotations from diverse content to improve the aggregate output accuracy. Content diversity is defined as a property of an input dataset—set of video frames in this case—which measures the mutual information of the set with respect to selected attribute. Less mutual information indicates greater content diversity. While we demonstrate the concept of leveraging content diversity in 3D video reconstruction task, we expect the strategy to benefit other annotation tasks, especially where the task requires complex manual annotations and needs highly accurate aggregation results. For other tasks to benefit from our approach, we suggest the task meets the following conditions: First, the instances to be annotated should share related and invariant information. For example, annotating two random images cannot leverage our approach because they capture different scenes, and have different camera specifications. Second, it must be possible to find content where target attributes vary across instances. In our study, the requester could determine timestamps of instances. Third, annotations to the content should be provided given the same request. In this experiment, the task was to "annotate three dimension lines: length, width, and height". If the task instruction varied between the contents, e.g., "annotate 3D bounding box", it would not be possible to aggregate the annotations due to their different response types.

Factors Affecting Self-Filtering

There are many factors which can affect the self-filtering rate and accuracy, but we believe three to be of primary importance: the quality of instructions, the complexity of the task, and the incentive mechanism. The instruction and task can be designed to help workers clearly understand the benefit of self-filtering. In our post survey, we asked workers who completed our task if they think it is better to provide an answer or not when they are not confident about the answer being correct. One worker answered, "I think an attempt at an answer is better than none at all. Even if you aren't sure an attempt at least shows your [sic] trying to help the study and not just wasting everyone's time". Another answered, "Try my level best to satisfy the requester". The survey response tells that crowd workers are willing to help the requester but they might not know what is most helpful, resulting in them submitting low-confidence annotations even when they should be self-filtered. Therefore, providing clear instructions on how to benefit the task would lead to better usage of self-filtering. Another factor that affects the self-filtering rate is the complexity of the task. If a task is too complex for the non-expert crowd workers, they might feel like self-filtering a lot of annotations. On the other hand, workers might submit a lot of low confidence annotations with the expectation to interact with the requester as a follow-up. In our post-study survey, one worker commented, "I think providing some answer is better than none. It creates a line of communication". Last, we believe that the incentive mechanism of the platform affects workers' use of the self-filtering option. Shah et al. [Ref. 34] gave a clear incentive to the workers, which encouraged them to use the self-filtering option ("I'm not sure" option) wisely. This resulted in the highest data quality in their experiments. Thus, requesters should clearly design an incentive mechanism and mention in the task how they would like workers to use the self-filtering option.

Other Factors Affecting State Estimation Accuracy

As indicated by our experiment on window size, and the counterintuitive result that a window of size three outperforms other window sizes, both the baseline and proposed state estimation method depend on parameters which must be carefully chosen. Improper parameters, especially when state bounds are manually specified, can cause the system to behave poorly in unpredictable ways.

Conclusion

In this disclosure, we have introduced a new crowdsourcing approach to collecting and aggregating image annotations in videos more efficiently and accurately. Our approach leverages particle filtering to aggregate annotations from multiple frames and provide an accurate final output even in the presence of incomplete or missing annotations. We introduced Popup, a human-machine hybrid system that realizes the proposed methods. The study results show that the proposed particle filtering based aggregation can not only handle noisy and missing annotations, but also provides more accurate 3D state estimations of objects in 2D videos. Because the proposed method is robust to missing annotations, one can reduce the overall latency of the data collection stage by allowing the annotators to self-filter. The output from Popup can be passed to simulation software to enable generating a realistic and large 3D training dataset of rare events for autonomous vehicles and machines to learn.

Example

Figure 12:
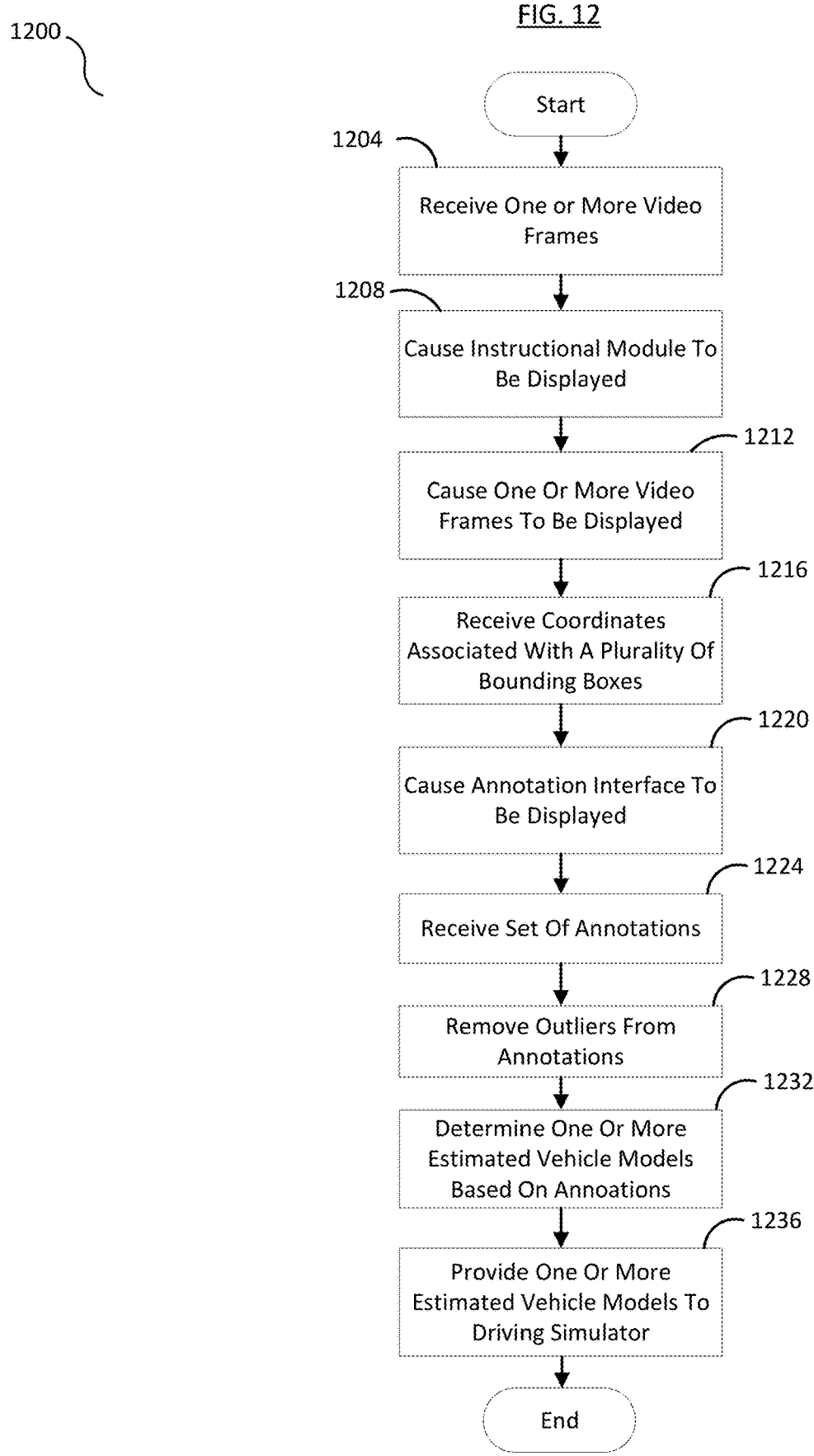
FIG. 12 shows a flow chart of a process for determining an estimated vehicle model based on a set of annotations.

Referring now to FIG. 12, an example of a process 1200 for determining an estimated vehicle model based on a set of annotations is shown. The process 1200 can include performing particle filtering with inter-frame referencing on annotations from workers (e.g., humans) as described above. The process 1200 can be implemented as instructions on one or more memories of a data processing system including one or more processors. The instructions can then be executed by the one or more processors.

At 1204, the process 1200 can receive one or more video frames. The one or more video frames can include a view of at least a portion of a vehicle such as a car or truck. In some embodiments, the one or more video frames can include ten or more video frames. The one or video frames can be sampled from a video clip at a predetermined sampling rate. In some embodiments, the sampling rate can be two frames per second. Each video frame can be associated with a unique time step. The process can then proceed to 1208.

At 1208, the process 1200 can cause an instructional module to be displayed to a plurality of users. The instructional module can include instructions about the annotation of a vehicle. The plurality of users can include human workers. The human workers can be positioned in front of a display such as a computer screen in order to see the instructions and/or the one or more video frames as will be described below. The instructions can include words and/or figures detailing how to annotate a vehicle. More specifically, the instructions can detail how to crop the vehicle from the video frame by drawing and/or adjusting a two-dimensional bounding box to include the vehicle while excluding as much of the video frame that does not include the vehicle as possible. Additionally, the instructions can detail how to draw two-dimensional annotation lines along three dimensions of the vehicle, for example the length, width, and height of the vehicle. Briefly referring to FIG. 3A, in some embodiments, the instruction can include at least a portion of the visualization and annotation interface 300 described above and shown in FIG. 3A. The process 1200 can then proceed to 1212.

At 1212, the process 1200 can cause at least a portion of the one or more video frames to be displayed to at least a portion of the plurality of users, specifically any human users included in the plurality of users. Generally, the process 1200 can iteratively cause one or more video frames to be displayed simultaneously to the user until all of the one or more video frames have been displayed. In some embodiments, the process 1200 can iteratively cause each video frame included in the one or more video frames to be displayed (e.g., one video frame at a time) until every video frame has been displayed to the user. In some embodiments, the process 1200 can iteratively cause multiple video frames included in the one or more video frames to be displayed. In some embodiments, the process 1200 can display a message or other prompt that a user should crop the vehicle from the video frame by drawing and/or adjusting a bounding box around the vehicle. The process 1200 can then proceed to 1216.

At 1216 the process 1200 can receive coordinates associated with a plurality of bounding boxes. Each bounding box can be associated with the video frame as well as a specific user and/or annotation lines to be generated later, as will be explained below. The coordinates can include (x,y) coordinates of each corner of the bounding box. Each user may have drawn a bounding box in response to being displayed a video frame, and the coordinates of each corner of the bounding box can be provided to the process 1200. The process 1200 can then proceed to 1220.

At 1220, the process 1200 can cause an annotation interface to be displayed to the plurality of users. The process 1200 can cause an option to provide annotations and/or cause an option to not provide annotations to be displayed to the plurality of users. The annotation interface can include one or more buttons to allow a worker to draw annotation lines on the video frame, and more specifically, the portion of the video frame included in the bounding box. Each user can then choose to annotate or not annotate the video frame. Briefly referring to FIG. 3B, in some embodiments, the annotation interface can include at least a portion of the annotation interface 318 described above and shown in FIG. 3B. The process 1200 can then proceed to 1224.

At 1224, the process 1200 can receive a set of annotations associated with the one or more video frames. The set of annotations can include two or more subsets of annotations, each subset of annotations being associated with a unique video frame included in the one or more video frames. Each annotation included in the set of annotations can include at least one two-dimensional line. Each two-dimensional line can be associated with a video frame, a dimension (i.e., a first dimension, a second dimension, or a third dimension) of the vehicle included in the video frame, and a user included in the plurality of users. Each two-dimensional line can include endpoint coordinates associated with pixel locations in the video frame. The first dimension can be height, the second dimension can be length, and the third dimension can be width. Each annotation can include multiple two-dimensional lines per dimension. The process 1200 can then proceed to 1228.

At 1228, the process 1200 can remove a number of outliers from the set of annotations. If the process 1200 determines there are no outliers present, no annotations will be removed. The process 1200 can remove at least one outlier from the set of annotations. Removing at least one outlier from the set of annotations can include removing an annotation (which can include multiple two-dimensional lines) and/or removing a single two-dimensional line. In order to determine if an annotation should be removed, the process 1200 can determine whether or not the bounding box associated with the annotation is an outlier. More specifically, the process 1200 can calculate a median bounding box based on the bounding boxes associated with the set of annotations. Then, for width and height independently, if a bounding box associated with an annotation does not overlap more than a predetermined percentage, such as 50%, with the median bounding box, the process 1200 can remove the annotation from the set of annotations. If the annotation does not overlap the median bounding box by more than a predetermined percentage, the user associated with the annotation may have not identified the vehicle correctly.

To determine if a single two-dimensional line should be removed from the set of annotations, the process 1200 can compare the distance of the length and angle of the two-dimensional line from the median length and median angle of the other two-dimensional lines associated with video frame and the same dimension as the single two-dimensional line. If the process 1200 determines the single two-dimensional line is outside a predetermined distance from either the median length or median angle, the process 1200 can remove the single two-dimensional line. In some embodiments, the predetermined distance can be 1.5×interquartile range of the median length or the median angle. Removing two-dimensional lines that are outside of the predetermined distance can filter out mistakes made by the users, for example, a height entry mistakenly drawn as a length entry or a line added by mistake and not removed, or low quality annotations. Using relative distances instead of absolute values as filtering criteria can be helpful because the size of an object can differ from 30 pixels to 300 pixels or more. The process 1200 can then proceed to 1232.

At 1232, the process 1200 can determine one or more estimated vehicle models based on the set of annotations. More specifically, for each video frame, the process 1200 can calculate an estimated vehicle model including a three dimensional volume, a position value, and an orientation value. Each estimated vehicle model can be included in a set of estimated vehicles. As will be explained below, the set of estimated vehicles can be used to generate training data for autonomous vehicles. To obtain the three dimensional volume, the process 1200 may receive vehicle dimensions from a supervisor using an internet resource or in appropriate documentation prior, and generating the three dimensional volume based on the vehicle dimensions. The process 1200 can then determine the location value and the orientation value. In some embodiments, the process 1200 can use a recursive Bayesian method such as a particle filtering method. The particle filtering method can include generating, for each subset of annotations associated with a unique time step, a plurality of particles, and determining, for each particle, a probability value. The process 1200 can then determine a most probable particle, and use a location value (e.g., x, y, and z coordinates), an orientation value, and a focal length of the most probable particle along with the three dimensional volume to determine the estimated vehicle model.

In some embodiments, the particle filtering method can include Algorithm 1 described above. More specifically, the process 1200 can perform at least a portion of steps 708-736 of the process 700 described above in accordance with FIG. 7. Using Algorithm 1, the process 1200 can generate, for each subset of annotations included in set of annotations, a plurality of particles. The location value can include the three-dimensional coordinates x, y, and z, and the orientation value can be 0 as calculated using Algorithm 1, where x, y, z denote the relative three-dimensional location of an object from the camera and $\theta$ denotes the orientation as illustrated at the bottom of FIG. 4. Additionally, a focal length f of the camera can be determined. When analyzing across a single frame, we perform the action and resampling steps after iterating through every set of annotations. One can use predetermined bounds for each parameter of the particle, such as $-30 \leq x \leq 30$, $-4 \leq y \leq 4$, $1 \leq z \leq 140$, $0 \leq \theta < \pi$ and $500 \leq f \leq 1000$, with x, y, and z being given in meters, $\theta$ in radians, and f in pixels. A predetermined number of particle such as 50,000 particles can be used as described above. The particle filtering method can use inter-frame referencing as described above, for example, using a three-frame window.

Using inter-frame referencing, each estimated vehicle model can be calculated based on the estimated vehicle model associated with a previous time step. The process 1200 can then proceed to 1236.

At 1236, the process 1200 can provide the one or more estimated vehicle models to a driving simulator such as CARLA. More specifically, each of the estimated vehicle models can be provided to a driving simulator in order to simulate the movement of the vehicle over the time period over which the video frames were taken. Other relevant information, such as a time value associated with each estimated vehicle model, can also be provided to the driving simulator. The movement of the vehicle can be used as training data to train autonomous vehicles by generating training data based on the vehicle shown in the video frames. The training data can help simulate how real world vehicles move and allow autonomous vehicle control processes to better sense and respond to real world driving conditions. The process 1200 can then end.

It is contemplated that one or more computer processes (e.g., "bots") could be configured to accept an input video frame and output annotations and a cropped region (e.g., a bounding box) as a human user would. If one or more computer processes are used to annotate video frames, either instead of or in addition to human users, the instructional module may not need to be displayed to the computer processes and the process 1200 could receive one or more video frames (e.g., at 1204), provide the video frames to the computer processes instead of displaying an instructional module and causing video frames to be displayed to human users (i.e., at 1208 and 1212), receive coordinates associated with a plurality of bounding boxes (e.g., at 1216), receive a set of annotations associated with the one or more video frames (e.g., at 1224) without causing an annotation interface to be displayed to the plurality of users (e.g., at 1220), and then performing steps 1228-1236 as described above.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 7 and/or 12 can be executed or performed in any order or sequence not limited to the order and sequence shown and described in the Figures. Also, some of the above steps of the processes of FIGS. 7 and/or 12 can be executed or performed substantially simultaneously where appropriate or in parallel to reduce latency and processing times.

It is understood that, while the process 1200 has been described in relation to reconstructing three-dimensional video from two-dimensional video data using particle filtering and thereby generating training data for autonomous vehicles, the process 1200 may also be used in in-home sensing and/or robotics applications or other applications where estimation based on two-dimensional information is relevant.

Thus, the invention provides a method for reconstructing three-dimensional video from two-dimensional video data using particle filtering and thereby generating training data for autonomous vehicles.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] 2017. Inside Waymo's Secret World for Training Self-Driving Cars. (2017). https://www.theatlantic.com/technology/archive/2017/08/inside-waymos-secret-testing-and-simulation-facilities/537648/[2]

2018. Waymo Has The Most Autonomous Miles, By A Lot. (2018). https://www.forbes.com/sites/davidsilver/2018/07/26/waymo-has-the-most-autonomous-miles-by-a-lot/ [3]

[3] Sean Bell, Paul Upchurch, Noah Snavely, and Kavita Bala. 2013. OpenSurfaces: A richly annotated catalog of surface appearance. ACM Transactions on Graphics (TOG) 32, 4 (2013), 111.

[4] Michael S Bernstein, Joel Brandt, Robert C Miller, and David R Karger. 2011. Crowds in two seconds: Enabling realtime crowd-powered interfaces. In Proceedings of the 24th annual ACM symposium on User interface software and technology. ACM, 33-42.

[5] Jeffrey P Bigham, Chandrika Jayant, Hanjie Ji, Greg Little, Andrew Miller, Robert C Miller, Robin Miller, Aubrey Tatarowicz, Brandyn White, Samual White, and others. 2010. VizWiz: nearly real-time answers to visual questions. In Proceedings of the 23nd annual ACM symposium on User interface software and technology. ACM, 333-342.

[6] Mariusz Bojarski, Davide Del Testa, Daniel Dworakowski, Bernhard Firner, Beat Flepp, Prasoon Goyal, Lawrence D Jackel, Mathew Monfort, Urs Muller, Jiakai Zhang, and others. 2016. End to end learning for self-driving cars. arXiv preprint arXiv:1604.07316 (2016).

[7] Matthieu Bray, Esther Koller-Meier, and Luc Van Gool. 2004. Smart particle filtering for 3D hand tracking. In Automatic Face and Gesture Recognition, 2004. Proceedings. Sixth IEEE International Conference on. IEEE, 675-680.

[8] Joseph Chee Chang, Saleema Amershi, and Ece Kamar. 2017. Revolt: Collaborative crowdsourcing for labeling machine learning datasets. In Proceedings of the 2017 CHI Conference on Human Factors in Computing Systems. ACM, 2334-2346.

[9] Alexander Philip Dawid and Allan M Skene. 1979. Maximum likelihood estimation of observer error-rates using the EM algorithm. Applied statistics (1979), 20-28.

[10] Roberto Di Salvo, Daniela Giordano, and Isaak Kavasidis. 2013. A crowdsourcing approach to support video annotation. In Proceedings of the International Workshop on Video and Image Ground Truth in Computer Vision Applications. ACM, 8.

[11] Alexey Dosovitskiy, German Ros, Felipe Codevilla, Antonio Lopez, and Vladlen Koltun. 2017. CARLA: An open urban driving simulator. arXiv preprint arXiv: 1711.03938 (2017).

[12] Ujwal Gadiraju, Besnik Fetahu, and Ricardo Kawase. 2015. Training workers for improving performance in crowdsourcing microtasks. In Design for Teaching and Learning in a Networked World. Springer, 100-114.

[13] Andreas Geiger, Philip Lenz, and Raquel Urtasun. 2012. Are we ready for Autonomous Driving? The KITTI Vision Benchmark Suite. In Conference on Computer Vision and Pattern Recognition (CVPR).

[14] Mitchell Gordon, Jeffrey P Bigham, and Walter S Lasecki. 2015. LegionTools: a toolkit+ UI for recruiting and routing crowds to synchronous real-time tasks. In Adjunct Proceedings of the 28th Annual ACM Symposium on User Interface Software & Technology. ACM, 81-82.

[15] Kotaro Hara, Jin Sun, Robert Moore, David Jacobs, and Jon Froehlich. 2014. Tohme: detecting curb ramps in google street view using crowdsourcing, computer vision, and machine learning. In Proceedings of the 27th annual ACM symposium on User interface software and technology. ACM, 189-204.

[16] Panagiotis G Ipeirotis, Foster Provost, and Jing Wang. 2010. Quality management on amazon mechanical turk. In Proceedings of the ACM SIGKDD workshop on human computation. ACM, 64-67.

[17] Nidhi Kalra and Susan M Paddock. 2016. Driving to safety: How many miles of driving would it take to demonstrate autonomous vehicle reliability? Transportation Research Part A: Policy and Practice 94 (2016), 182-193.

[18] Ece Kamar, Severin Hacker, and Eric Horvitz. 2012. Combining human and machine intelligence in large-scale crowdsourcing. In Proceedings of the 11th International Conference on Autonomous Agents and Multiagent Systems. International Foundation for Autonomous Agents and Multiagent Systems, 467-474.

[19] Alexandre Kaspar, Genevieve Patterson, Changil Kim, Yagiz Aksoy, Wojciech Matusik, and Mohamed Elgharib. 2018. Crowd-Guided Ensembles: How Can We Choreograph Crowd Workers for Video Segmentation?. In Proceedings of the 2018 CHI Conference on Human Factors in Computing Systems (CHI '18). ACM, New York, N.Y., USA, Article 111, 111:1-111:12 pages.

[20] Juho Kim, Phu Tran Nguyen, Sarah Weir, Philip J Guo, Robert C Miller, and Krzysztof Z Gajos. 2014. Crowdsourcing step-by-step information extraction to enhance existing how-to videos. In Proceedings of the SIGCHI Conference on Human Factors in Computing Systems. ACM, 4017-4026.

[21] Aniket Kittur, Jeffrey V Nickerson, Michael Bernstein, Elizabeth Gerber, Aaron Shaw, John Zimmerman, Matt Lease, and John Horton. 2013. The future of crowd work. In Proceedings of the 2013 conference on Computer supported cooperative work. ACM, 1301-1318.

[22] Ranjay Krishna, Yuke Zhu, Oliver Groth, Justin Johnson, Kenji Hata, Joshua Kravitz, Stephanie Chen, Yannis Kalantidis, Li-Jia Li, David A Shamma, and others. 2017. Visual genome: Connecting language and vision using crowdsourced dense image annotations. International Journal of Computer Vision 123, 1 (2017), 32-73.

[23] B Kwolek. Model Based Facial Pose Tracking Using a Particle Filter. In Geometric Modeling and Imaging— New Trends (GMAI'06).

[24] Gierad Laput, Walter S Lasecki, Jason Wiese, Robert Xiao, Jeffrey P Bigham, and Chris Harrison. 2015. Zensors: Adaptive, rapidly deployable, human-intelligent sensor feeds. In Proceedings of the 33rd Annual ACM Conference on Human Factors in Computing Systems. ACM, 1935-1944.

[25] Walter S. Lasecki, Mitchell Gordon, Danai Koutra, Malte F. Jung, Steven P. Dow, and Jeffrey P. Bigham. 2014. Glance: Rapidly coding behavioral video with the crowd. In Proceedings of the 27th annual ACM symposium on User interface software and technology. ACM, 551-562.

[26] Walter S. Lasecki, Young Chol Song, Henry Kautz, and Jeffrey P. Bigham. 2013. Real-time crowd labeling for deployable activity recognition. In Proceedings of the 2013 conference on Computer supported cooperative work. ACM, 1203-1212.

[27] Tsung-Yi Lin, Michael Maire, Serge Belongie, James Hays, Pietro Perona, Deva Ramanan, Piotr Dollar, and C Lawrence Zitnick. 2014. Microsoft coco: Common objects in context. In European conference on computer vision. Springer, 740-755.

[28] Andrew Mao, Ece Kamar, Yiling Chen, Eric Horvitz, Megan E Schwamb, Chris J Lintott, and Arfon M Smith. 2013. Volunteering versus work for pay: Incentives and tradeoffs in crowdsourcing. In First I conference on human computation and crowdsourcing.

[29] Michael Montemerlo and Sebastian Thrun. 2007. Fast-SLAM 2.0. FastSLAM: A scalable method for the simultaneous localization and mapping problem in robotics (2007), 63-90.

[30] Michael Montemerlo, Sebastian Thrun, Daphne Koller, Ben Wegbreit, and others. 2002. FastSLAM: A factored solution to the simultaneous localization and mapping problem.

[31] Louis Albert Necker. 1832. LXI. Observations on some remarkable optical phenomena seen in Switzerland; and on an optical phenomenon which occurs on viewing a figure of a crystal or geometrical solid. The London, Edinburgh, and Dublin Philosophical Magazine and Journal of Science 1, 5 (1832), 329-337.

[32] Kenji Oka, Yoichi Sato, Yasuto Nakanishi, and Hideki Koike. 2005. Head Pose Estimation System Based on Particle Filtering with Adaptive Diffusion Control. In MVA. 586-589.

[33] Sunghyun Park, Gelareh Mohammadi, Ron Artstein, and Louis-Philippe Morency. 2012. Crowdsourcing micro-level multimedia annotations: The challenges of evaluation and interface. In Proceedings of the ACM multimedia 2012 workshop on Crowdsourcing for multimedia. ACM, 29-34.

[34] Nihar Bhadresh Shah and Denny Zhou. 2015. Double or nothing: Multiplicative incentive mechanisms for crowdsourcing. In Advances in neural information processing systems. 1-9.

[35] Jean Y. Song, Raymond Fok, Alan Lundgard, Fan Yang, Juho Kim, and Walter S. Lasecki. 2018. Two Tools Are Better Than One: Tool Diversity As a Means of Improving Aggregate Crowd Performance. In 23rd International Conference on Intelligent User Interfaces (IUI '18). ACM, New York, N.Y., USA, 559-570.

[36] Alexander Sorokin, Dmitry Berenson, Siddhartha S Srinivasa, and Martial Hebert. 2010. People helping robots helping people: Crowdsourcing for grasping novel objects. In 2010 IEEE/RSJ International Conference on Intelligent Robots and Systems. IEEE, 2117-2122.
[37] Hao Su, Charles R Qi, Yangyan Li, and Leonidas J Guibas. 2015. Render for cnn: Viewpoint estimation in images using cnns trained with rendered 3d model views. In Proceedings of the IEEE International Conference on Computer Vision. 2686-2694.
[38] Ryan Szeto and Jason J Corso. 2017. Click Here: Human-Localized Keypoints as Guidance for Viewpoint Estimation. In 2017 IEEE International Conference on Computer Vision (ICCV). IEEE, 1604-1613.
[39] Sebastian Thrun. 2000. Monte carlo pomdps. In Advances in neural information processing systems. 1064-1070.
[40] Carl Vondrick, Donald Patterson, and Deva Ramanan. 2013. Efficiently scaling up crowdsourced video annotation. International Journal of Computer Vision 101, 1 (2013), 184-204.
[41] Thomas Wiegand, Gary J Sullivan, Gisle Bjontegaard, and Ajay Luthra. 2003. Overview of the H. 264/AVC video coding standard. IEEE Transactions on circuits and systems for video technology 13, 7 (2003), 560-576.
[42] Jenny Yuen, Bryan Russell, Ce Liu, and Antonio Torralba. 2009. Labelme video: Building a video database with human annotations. In Computer Vision, 2009 IEEE 12th International Conference on. IEEE, 1451-1458.
[43] Yu Zhong, Walter S. Lasecki, Erin Brady, and Jeffrey P. Bigham. 2015. Regionspeak: Quick comprehensive spatial descriptions of complex images for blind users. In Proceedings of the 33rd Annual ACM Conference on Human Factors in Computing Systems. ACM, 2353-2362.
[44] Ciyou Zhu, Richard H Byrd, Peihuang Lu, and Jorge Nocedal. 1997. Algorithm 778: L-BFGS-B: Fortran subroutines for large-scale bound-constrained optimization. ACM Transactions on Mathematical Software (TOMS) 23, 4 (1997), 550-560.
[45] Jonathan Bragg, Mausam, and Daniel S. Weld. 2013. Crowdsourcing multi-label classification for taxonomy creation. In *First AAAI conference on human computation and crowdsourcing*.
[46] Sai R Gouravajhala, Jinyeong Yim, Karthik Desingh, Yanda Huang, Odest Chadwicke Jenkins, and Walter S Lasecki. 2018. EURECA: Enhanced Understanding of Real Environments via Crowd Assistance. (2018).
[47] Harmanpreet Kaur, Mitchell Gordon, Yiwei Yang, Jeffrey P Bigham, Jaime Teevan, Ece Kamar, and Walter S Lasecki. 2017. Crowdmask: Using crowds to preserve privacy in crowd-powered systems via progressive filtering. In *Proceedings of the AAAI Conference on Human Computation (HCOMP 2017)*, HCOMP, Vol. 17.
[48] Walter S Lasecki, Christopher Homan, and Jeffrey P Bigham. 2014. Architecting real-time crowd-powered systems. *Human Computation* 1, 1 (2014).
[49] Walter S Lasecki, Christopher M Homan, and Jeffrey L Bigham. 2014. Tuning the Diversity of Open-Ended Responses From the Crowd. In *Second AAAI Conference on Human Computation and Crowdsourcing*.
[50] Walter S. Lasecki, Kyle I. Murray, Samuel White, Robert C. Miller, and Jeffrey P. Bigham. 2011. Real-time crowd control of existing interfaces. In *Proceedings of the 24th annual ACM symposium on User interface software and technology*. ACM, 23-32.
[51] Walter S Lasecki, Rachel Wesley, Jeffrey Nichols, Anand Kulkarni, James F Allen, and Jeffrey P Bigham. 2013. Chorus: a crowd-powered conversational assistant. In *Proceedings of the 26th annual ACM symposium on User interface software and technology*. ACM, 151-162.
[52] Christopher Lin, Mausam, and Daniel Weld. 2012. Dynamically Switching between Synergistic workflows for Crowdsourcing. In *AAAI Conference on Artificial Intelligence*.
[53] Leonid Pishchulin, Stefanie Wuhrer, Thomas Helten, Christian Theobalt, and Bernt Schiele. 2017. Building statistical shape spaces for 3d human modeling. *Pattern Recognition* 67 (2017), 276-286.
[54] Akshay Rao, Harmanpreet Kaur, and Walter S Lasecki. 2018. Plexiglass: Multiplexing Passive and Active Tasks for More Efficient Crowdsourcing. In *Proceedings of the AAAI 2018 Conference on Human Computation*. ACM.
[55] Yu-Jung Tsai, Alexandre Bousse, Matthias J Ehrhardt, Charles W Stearns, Sangtae Ahn, Brian F Hutton, Simon Arridge, and Kris Thielemans. 2018. Fast Quasi-Newton Algorithms for Penalized Reconstruction in Emission Tomography and Further Improvements via Preconditioning. *IEEE transactions on medical imaging* 37, 4 (2018), 1000-1010.
[56] Jinyeong Yim, Jeel Jasani, Aubrey Henderson, Danai Koutra, Steven P Dow, Winnie Leung, Ellen Lim, Mitchell Gordon, Jeffrey P Bigham, and Walter S Lasecki. 2016. Coding Varied Behavior Types Using the Crowd. In *Proceedings of the 19th ACM Conference on Computer Supported Cooperative Work and Social Computing Companion*. ACM, 114-117.

The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a vehicle reconstruction system, the method comprising:
 (a) receiving a set of annotations associated with a video frame comprising a view of at least a portion of a vehicle, each annotation comprising at least one two-dimensional line;
 (b) receiving a set of bounding boxes associated with the video frame, each bounding box associated with an annotation included in the set of annotations;
 (c) removing at least one outlier from the set of annotations by:
  determining a target bounding box included in the set of bounding boxes is an outlier; and
  removing the at least one two-dimensional line included in the annotation associated with the target bounding box from the set of annotations;
 (d) determining an estimated vehicle model based on the set of annotations; and
 (e) providing the estimated vehicle model to a driving simulator.

2. The method of claim 1, wherein one of the annotations is based on input attributed to a human.

3. The method of claim 1, wherein each two-dimensional line is overlaid on the video frame.

4. The method of claim 1, wherein the determining the target bounding box is an outlier comprises:
 determining a second target bounding box included in the set of bounding boxes is a median;
 determining a percentage of the target bounding box that does not overlap the second target bounding box; and
 determining that the percentage is below a predetermined threshold.

5. The method of claim 4, wherein the percentage is about fifty percent.

6. The method of claim 1, wherein the at least one two-dimensional line of each annotation in the set of annotations comprises a first two-dimensional line associated with a first dimension, a second two-dimensional line associated with a second dimension, and a third two-dimensional line associated with a third dimension.

7. The method of claim 6, wherein the removing at least one outlier from the set of annotations comprises:
determining a first target two-dimensional line associated with the first dimension and included in the set of annotations is a median;
determining that a second target two-dimensional line associated with the first dimension and included in the set of annotations is not within a threshold range of the first target two-dimensional line; and
removing the second target two-dimensional line from the set of annotations.

8. The method of claim 7 further comprising:
determining an interquartile range of all two-dimensional lines included in the set of annotations and associated with the first dimension; and
determining the threshold range based on the interquartile range.

9. The method of claim 1, wherein the estimated vehicle model comprises a three dimensional volume, a position value, and an orientation value.

10. The method of claim 1 further comprising:
(f) simulating movement of the estimated vehicle model over a time period using the driving simulator and using the movement of the estimated vehicle model as training data to train an autonomous vehicle.

11. A method in a data processing system comprising at least one processor and at least one memory, the at least one memory comprising instructions executed by the at least one processor to implement a vehicle reconstruction system, the method comprising:
(a) receiving a set of annotations comprising at least two subsets of annotations, each subset of annotations being associated with a video frame included in a set of video frames, each video frame comprising a view of at least a portion of a vehicle, and each annotation comprising at least one two-dimensional line;
(b) receiving a set of bounding boxes associated with a first video frame included in the set of video frames, each bounding box associated with an annotation included in the set of annotations;
(c) removing at least one outlier from the set of annotations by:
determining a target bounding box included in the set of bounding boxes is an outlier; and
removing the at least one two-dimensional line included in the annotation associated with the target bounding box from the set of annotations;
(d) determining a set of estimated vehicle models based on the set of annotations, each estimated model associated with a video frame in the set of video frames; and
(e) providing the set of estimated vehicle models to a driving simulator.

12. The method of claim 11, wherein each estimated vehicle model is associated with a time step, and wherein each estimated vehicle model is determined based on a second estimated vehicle model associated with a previous time step.

13. The method of claim 11, wherein each estimated vehicle model is determined using a recursive Bayesian method.

14. The method of claim 13, wherein the recursive Bayesian method is particle filtering.

15. The method of claim 14, wherein the particle filtering comprises:
generating, for each subset of annotations associated, a plurality of particles, each particle being associated with a cuboid; and
determining, for each particle, a probability value based on the at least one two-dimensional line.

16. The method of claim 11, wherein each estimated vehicle model comprises a three dimensional volume, a position value, and an orientation value.

17. A method in a data processing system comprising at least one processor and at least one memory, the at least one memory comprising instructions executed by the at least one processor to implement a vehicle reconstruction system, the method comprising:
(a) causing a video frame comprising a view of at least a portion of a vehicle to be displayed to a plurality of users;
(b) causing an option to provide annotations corresponding to the video frame to be displayed to a plurality of users;
(c) causing an option to not provide annotations corresponding to the video frame to be displayed to a plurality of users;
(d) receiving a number of annotations corresponding to the video frame from the plurality of users;
(e) calculating an estimated vehicle model based on the number of annotations; and
(f) providing the estimated vehicle model to a driving behavior analyzer,
wherein the method further comprises:
receiving a set of bounding boxes associated with the video frame, each bounding box associated with an annotation included in the number of annotations, and
removing at least one outlier from the number of annotations by:
determining a target bounding box included in the set of bounding boxes is an outlier; and
removing the at least one two-dimensional line included in the annotation associated with the target bounding box from the number of annotations.

18. The method of claim 17 further comprising
causing an instructional module to be displayed to the plurality of users, the instructional module comprising instructions to provide at least one first dimensional line along a first dimension and to provide at least one second dimensional line along a second dimension.

19. The method of claim 18, wherein the instructional module further comprises instructions to provide at least one third dimensional line along a third dimension.

20. The method of claim 17, further comprising
receiving a selection to provide annotations from a group of users, the group of users comprising at least a portion of the plurality of users;
receiving the number of annotations from the group of users.

* * * * *

UNITED STATES PATENT AND TRADEMARK OFFICE
CERTIFICATE OF CORRECTION

PATENT NO. : 11,361,500 B2
APPLICATION NO. : 16/704529
DATED : June 14, 2022
INVENTOR(S) : Jean Young S. Kwon et al.

It is certified that error appears in the above-identified patent and that said Letters Patent is hereby corrected as shown below:

In the Specification

Column 16, Line 8, "$x_9$" should be --$x_g$--.

Column 22, Line 54, "be 0 as" should be --be $\theta$ as--.

Signed and Sealed this
Sixteenth Day of August, 2022

Katherine Kelly Vidal
*Director of the United States Patent and Trademark Office*